United States Patent [19]

Sakanishi et al.

[11] Patent Number: 5,042,063
[45] Date of Patent: Aug. 20, 1991

[54] TELEPHONE APPARATUS WITH VOICE ACTIVATED DIALING FUNCTION

[75] Inventors: Masayuki Sakanishi; Hiroki Yoshida, both of Tokyo; Takaaki Ishii, Kanagawa; Hiroshi Sato; Makoto Hoshino, both of Tokyo, all of Japan

[73] Assignee: Kabushiki Kaisha Toshiba, Kanagawa, Japan

[21] Appl. No.: 242,677

[22] Filed: Sep. 9, 1988

[30] Foreign Application Priority Data

| Sep. 11, 1987 | [JP] | Japan | 62-227929 |
| Sep. 16, 1987 | [JP] | Japan | 62-231689 |
| Sep. 30, 1987 | [JP] | Japan | 62-246230 |
| Sep. 30, 1987 | [JP] | Japan | 62-247508 |

[51] Int. Cl.$^5$ .................. G10L 9/14; H04M 1/272; H04M 1/56
[52] U.S. Cl. ........................... 379/88; 379/58; 379/63; 379/354; 381/43
[58] Field of Search ............ 379/355, 354, 88, 67, 379/356, 353, 361, 360, 63, 59, 58; 364/513.5; 381/43

[56] References Cited

U.S. PATENT DOCUMENTS

| 4,731,811 | 3/1988 | Dubus | 379/58 |
| 4,737,976 | 4/1988 | Borth et al. | 379/58 |
| 4,853,953 | 8/1989 | Fujisaki | 379/88 |
| 4,864,622 | 9/1989 | Iida et al. | 381/41 |
| 4,873,714 | 10/1989 | Ishii et al. | 379/88 |
| 4,949,374 | 8/1990 | Ishii et al. | 379/88 |
| 4,959,850 | 9/1990 | Marui | 379/58 |
| 4,961,212 | 10/1990 | Marui et al. | 379/67 |

*Primary Examiner*—Thomas W. Brown
*Attorney, Agent, or Firm*—Finnegan, Henderson, Farabow, Garrett, and Dunner

[57] ABSTRACT

Telephone apparatus in which a call may be made in response to utterances of a user by speech recognition without manually dialing a telephone number. The telephone apparatus includes a storage device for storing a set of parameters corresponding to an expected speech signal, which are used for recognizing the user's subsequent utterance and/or for indicating differences between the utterance and the stored signal. The telephone apparatus further includes a storage device for storing the speech signal so that the stored speech signal can be reproduced. The reproduced speech signal is used to confirm the stored speech signal. The stored speech signal may be reproduced in response to a user's key operation when the telephone apparatus is in a confirmation mode and in response to a user's utterance when the telephone apparatus is in a registration or voice calling mode.

25 Claims, 21 Drawing Sheets

| REGISTER NUMBER | TELEPHONE DIAL NUMBER | START ADDRESS | END ADDRESS |
|---|---|---|---|
| 1 | 201-234-1111 | 0000000000100 | 0000100000000 |
| 2 | 202-345-1111 | 0000100000001 | 0001000000000 |
| 3 | 203-567-1111 | 0001000000001 | 0000100000000 |
| -------- | -------- | -------- | -------- |
| 20 | 220-123-1111 | 1111000000001 | 1111111111111 |

Fig. 9.

TELEPHONE APPARATUS WITH VOICE ACTIVATED DIALING FUNCTION

FIELD OF THE INVENTION

The present invention relates to telephones such as mobile telephones. More specifically, this invention relates to radio telephones in which a call may be made responsive to human utterances.

BACKGROUND OF THE INVENTION

In recent years, by means of speech recognition function equipped in mobile telephones, a call origination may be made in response to utterances of operators without manually dialing. Such function is called voice dial function or voice activated dialing.

The voice dial function will be achieved by storing feature parameters of speech patterns associated with parties to be called and the corresponding telephone dial numbers in advance and by checking for a correspondence between the feature parameters of speech pattern of words uttered by a user at call origination and that of the stored speech patterns. In conventional mobile telephones, however, users are allowed neither to confirm what speech patterns had been stored nor to check for how speech patterns have been stored. Furthermore, if similar speech patterns have been once registered, wrong call due to misrecognition may be often made.

SUMMARY OF THE INVENTION

It is accordingly an object of the present invention to provide an improved telephone apparatus in which voice dialing may be made in response to user uttered words.

It is a further object of this invention to provide an improved telephone apparatus in which user uttered words are correctly registered and a call is accurately made in voice dial mode.

It is still a further object of this invention to provide an improved telephone apparatus by which the user may confirm the accuracy of registered words for a voice dial function.

It is still a further object of this invention to provide an improved telephone apparatus in which registration of similar words may be avoided, so that a call is accurately made in a voice dial mode.

To achieve one or more of the objects and in accordance with purpose of the invention as embodied and described herein, the invention includes a telephone apparatus. In the telephone apparatus, a device inputs at least one telephone dial number. A first storage device stores each inputted telephone dial number. A device which is responsive to a user's utterance generates a digital speech signal which corresponds to a telephone dial number. A device which is responsive to the digital speech signal extracts a set of predetermined feature parameters from the digital speech signal. A second storage device stores the extracted set of feature parameters and address information corresponding to each stored telephone dial number. A third storage device stores the digital speech signal and address information corresponding to each stored telephone dial number. A device reproduces the digital speech signal for confirming whether the user's utterance corresponds to the digital speech signal. A call origination device automatically originates a telephone call to one of the at least one stored telephone dial number which corresponds to the digital speech signal generated by the speech input means at times when the telephone apparatus is in a voice calling mode, and a set of predetermined feature parameters of one of the at least one stored digital speech signal is substantially identical to the set of predetermined feature parameters of the generated digital speech signal.

Furthermore, to achieve one or more of the objects and in accordance with purpose of the invention. as embodied and described herein the invention includes a telephone apparatus. In the telephone apparatus a device inputs at least one telephone dial number. A first storage device stores each inputted telephone dial number. A device is responsive to a user's utterance generates a digital speech signal which corresponds a telephone dial number. A device which is responsive to the digital speech signal extracts a set of predetermined feature parameters from the digital speech signal. A second storage device stores the extracted set of feature parameters and address information corresponding to each stored telephone dial number. A third storage device stores the digital speech signal and address information corresponding to each stored telephone dial number. A call origination device automatically originates a telephone call to one of the at least one stored telephone dial number which corresponds to the digital speech signal generated by the speech input means at times when the telephone apparatus is in a voice calling mode, and a set of predetermined feature parameters of one of the at least one stored digital speech signal is substantially identical to the set of predetermined feature parameters of the generated digital speech signal. A device detects a difference between the set of predetermined feature parameters of the generated digital speech signal corresponding to the user's utterance at times when the telephone apparatus is in a voice calling mode and the set of feature parameters corresponding to each stored digital speech signal. A device generates information corresponding to at least one detected differences.

BRIEF DESCRIPTION OF THE DRAWINGS

FIG. 9 illustrates contents of RAM 335 shown in FIG. 3

DESCRIPTION OF THE PREFERRED EMBODIMENT

A preferred embodiment of the present invention will be described with reference to the accompanying drawings.

1. Basic mobile telephone

1-a. General description

Figure 1:
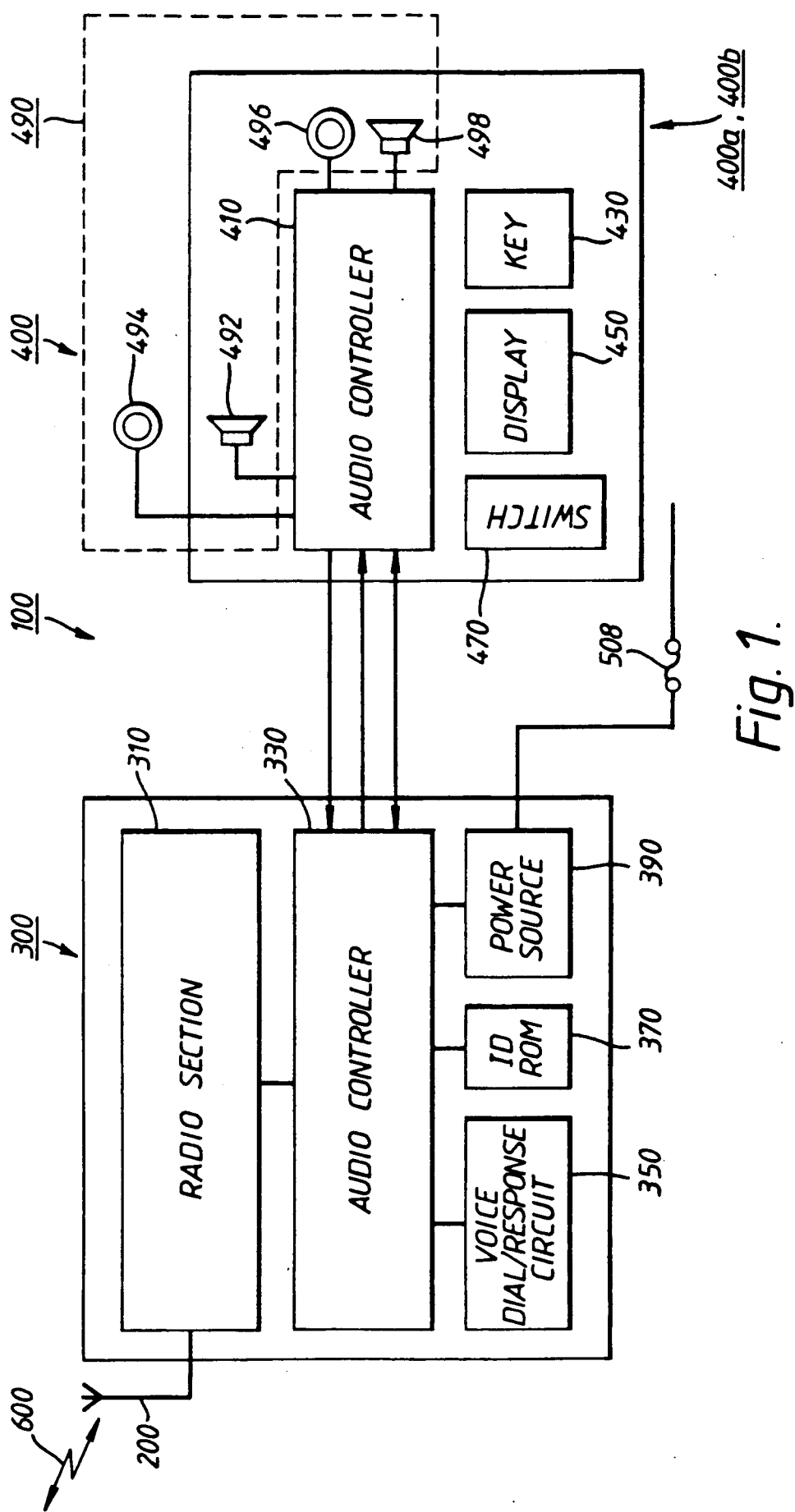
FIG. 1 is a block diagram showing an arrangement of a mobile telephone apparatus according to an embodiment of the present invention.

FIG. 1 is a block diagram showing an arrangement of a mobile telephone apparatus according to an embodiment of the present invention.

Figure 2:
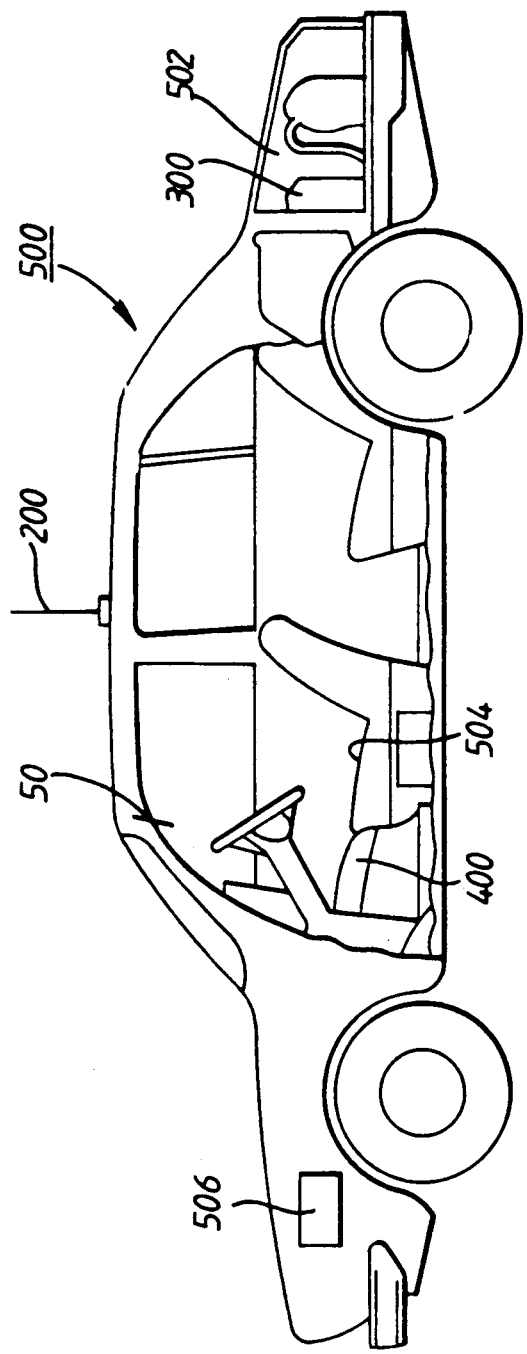
FIG. 2 is a view showing a state wherein the mobile telephone apparatus is mounted in an automobile.

Referring to FIG. 1, mobile telephone apparatus 100 comprises antenna 200, radio unit 300, and telephone set 400. As shown in FIG. 2, antenna 200 is mounted on an outer body surface of automobile 500. Radio unit 300 is mounted inside trunk 502 of automobile 500. Telephone set 400 is mounted near driver's seat 504 inside automobile 500.

Radio unit 300 mainly comprises radio section 310 for establishing radio channel 600 with a base station (not shown) through antenna 200 and for exchanging signals therewith, audio controllers 330 for controlling the overall operations of radio unit 300, voice dial/response circuit 350 for performing speech recognition and synthesis and for storing speech pattern signals, ID ROM 370 for storing ID (Identification Number) and telephone numbers, and power source 390 for supplying power from battery 506 (FIG. 2) mounted in the automobile to the above components through fuse 508.

Telephone set 400 mainly comprises audio controller 410 for controlling the overall operations of telephone set 400 in response to an instruction or the like from audio controller 330, keys 430 for entering key inputs, display unit 450 for displaying contents, switches 470 for performing various switching operations, and audio input/output unit 490 for inputting or outputting an audible sound. Telephone set 400 comprises main unit 400a and handset 400b. Some components of audio controller 410 and switches 470 are incorporated in main unit 400a. Hands-free microphone 494 mounted on sunvisor 510 or the like near driver's seat 504 is connected to main unit 400a. Some components of audio controller 410, keys 430, and display 450 are mounted in handset 400b. Handset microphone 466 and handset receiver 498 which constitute audio input/output unit 490 are provided to handset 400b.

Figure 3:
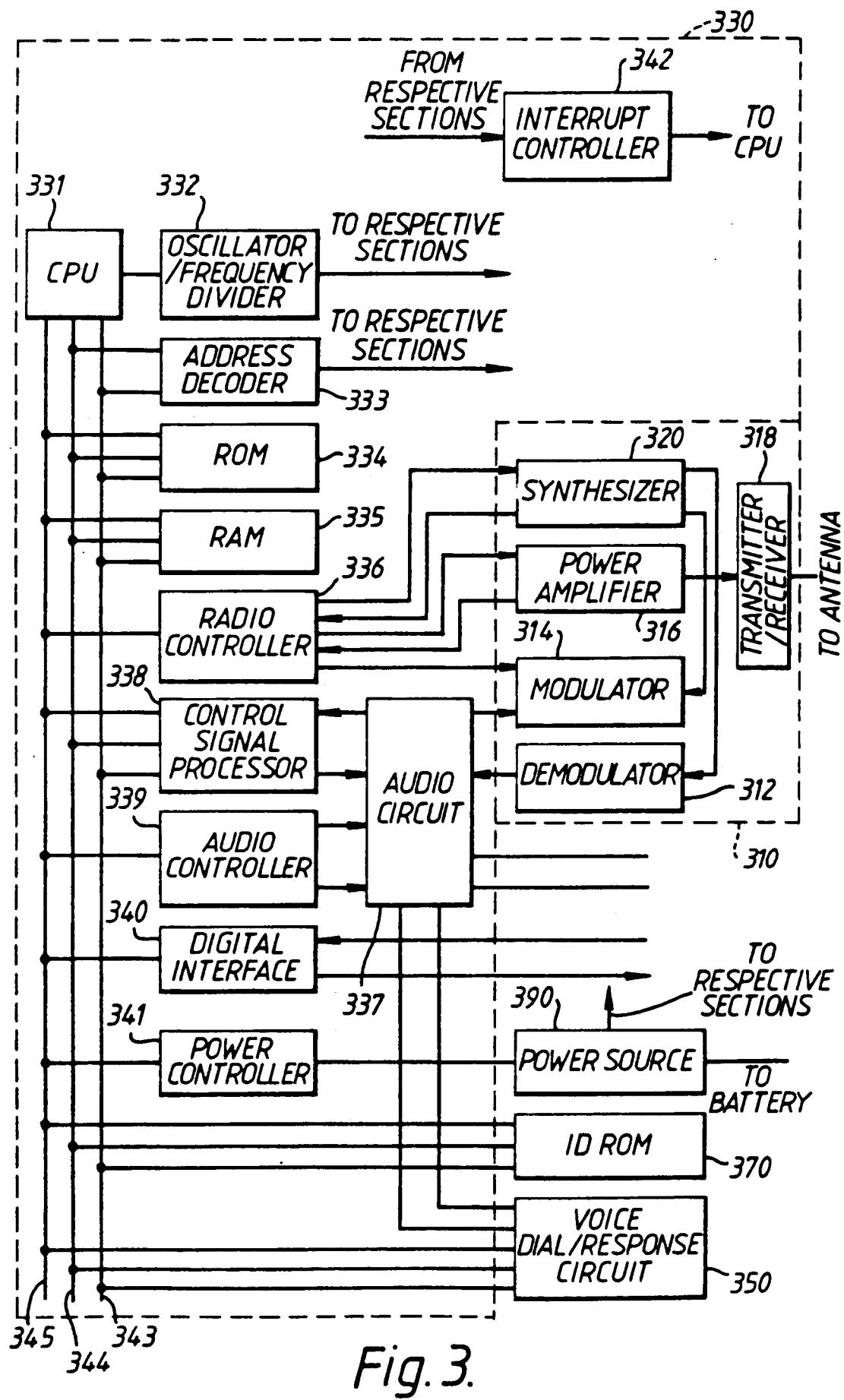
FIG. 3 is a block diagram of a radio unit in the mobile telephone apparatus.

FIG. 3 is a block diagram showing a detailed arrangement of the radio unit described above.

Referring to FIG. 3, radio section 310 comprises demodulator 312, modulator 314, power amplifier 316, transmitter/receiver 318, and synthesizer 300. Demodulator 312 demodulates a radio signal received from the base station through radio channel 600, antenna 200, and transmitter/receiver 318. It should be noted that this signal includes audible sound signals and control signals. Modulator 314 modulates the audio and control signals and the like from audio controller 330 and generates transmission signals.

Power amplifier 316 amplifies the transmission signals from modulator 314. The amplification of power amplifier 316 is variable, e.g., 8-step variable. Duplexer 318 sends, to demodulator 312, the signals received through radio channel 600 and antenna 200 and, to antenna 200, the signals from modulator 314 and power amplifier 316. Synthesizer 320 comprises a channel selection local oscillator and specifies a frequency in which signals are demodulated by demodulator 312 and a frequency in which signals are modulated by modulator 314. About 666 channels are available for synthesizer 320.

Audio controller 330 comprises CPU 331, oscillator/frequency divider 332, address decoder 333, ROM 334, RAM 335, radio controller 336, audio circuit 337, control signal processor 338, audio controller 339, digital interface 340, power controller 341, and interrupt controller 342. Reference numeral 343 denotes an 8-bit data bus; 334, address bus; and 345, control bus. CPU 331 controls the operations of audio controller 330. Oscillator/frequency divider 332 supplies clock signals to CPU 331 and divides the clock signals so as to supply the frequency-divided pulses as timing pulses to each section of the mobile telephone apparatus. Address decoder 333 outputs predetermined operation signals to the components in response to instruction signals from CPU 331. ROM 334 stores various programs required for operations of CPU 331. RAM 335 stores various kinds of data during processing of CPU 331. For example, as shown in FIG. 9, telephone dial numbers, the corresponding register numbers which are shorter than the telephone numbers in length, and start and end addresses which indicate where the corresponding speech pattern signals are located in after-mentioned RAM (1) 708 are stored in RAM 335. Radio controller 336 controls radio section 310 in response to an instruction from CPU 331. For example, radio controller 336 sends to synthesizer 320 signals indicative of a frequency available to the synthesizer 320, to power amplifier 316 signals indicative of an amplification available for power amplifier 316, and to modulator 314 signals indicative of parameters for modulation in modulator 314. Radio controller 336 receives a step-out signal from synthesizer 320 and output power detection signals from power amplifier 316 and supplies them to CPU 331, thereby preventing operation errors. Audio circuit 337 extracts control signals and audio signals from the received signals demodulated by demodulator 312 and supplies the control signals to control signal processor 338 and the audio signals to voice dial unit 350 and telephone set 400. Audio circuit 337 also supplies, to modulator 314, to control signal from control signal processor 338 and audio signals from telephone set 400 and voice dial unit 350. It should be noted that audio circuit 337 also arranges the wave form of the control signal to be sent to control signal processor 338 in a certain wave form and filters the control signal to be applied to modulator 314. Control signal processor 338, acquires bit and frame synchronization with the control signal from audio circuit 337. Maintaining the acquired synchronization, control signal processor 338 converts the serial control signals including control data received from a base station into parallel signals and converts the parallel control data signals to be transmitted to a base station into serial signals, which are sent to audio circuit 337. Audio controller 339 controls audio circuit 337. For example, under the control of audio controller 339, audio circuit 337 selectively applies the received signals from demodulator 312 to control signal processor 338, voice dial/response circuit 350, or telephone set 400 and selectively receives the signals from control signal processor 338, voice dial/response circuit 350, or telephone set 400. Digital interface 340 interfaces data communication between radio unit 300 and telephone set 400. Power controller 341 controls power source 390. For example, power controller 341 sets a voltage supplied from battery 506 to power source 390 to a predetermined level. The voltage having the predetermined level is supplied to the respective components. Interrupts controller 342 interrupts CPU 331 in response to an interrupt signal from each component.

1-b. Voice dial/response circuit

Figure 4:
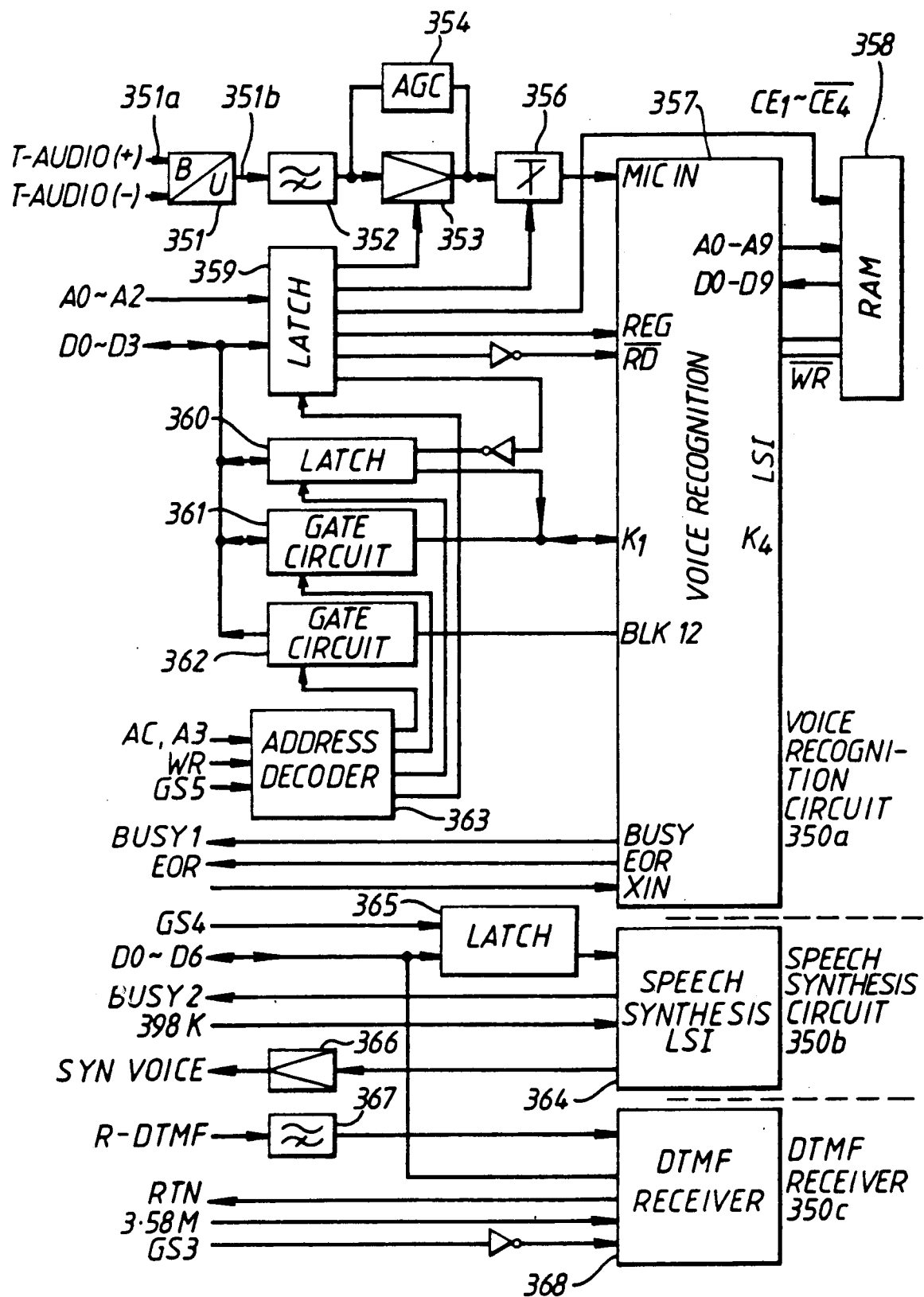
FIG. 4 is a block diagram of a voice dial circuit in the radio unit in the mobile telephone apparatus.
Figure 7:
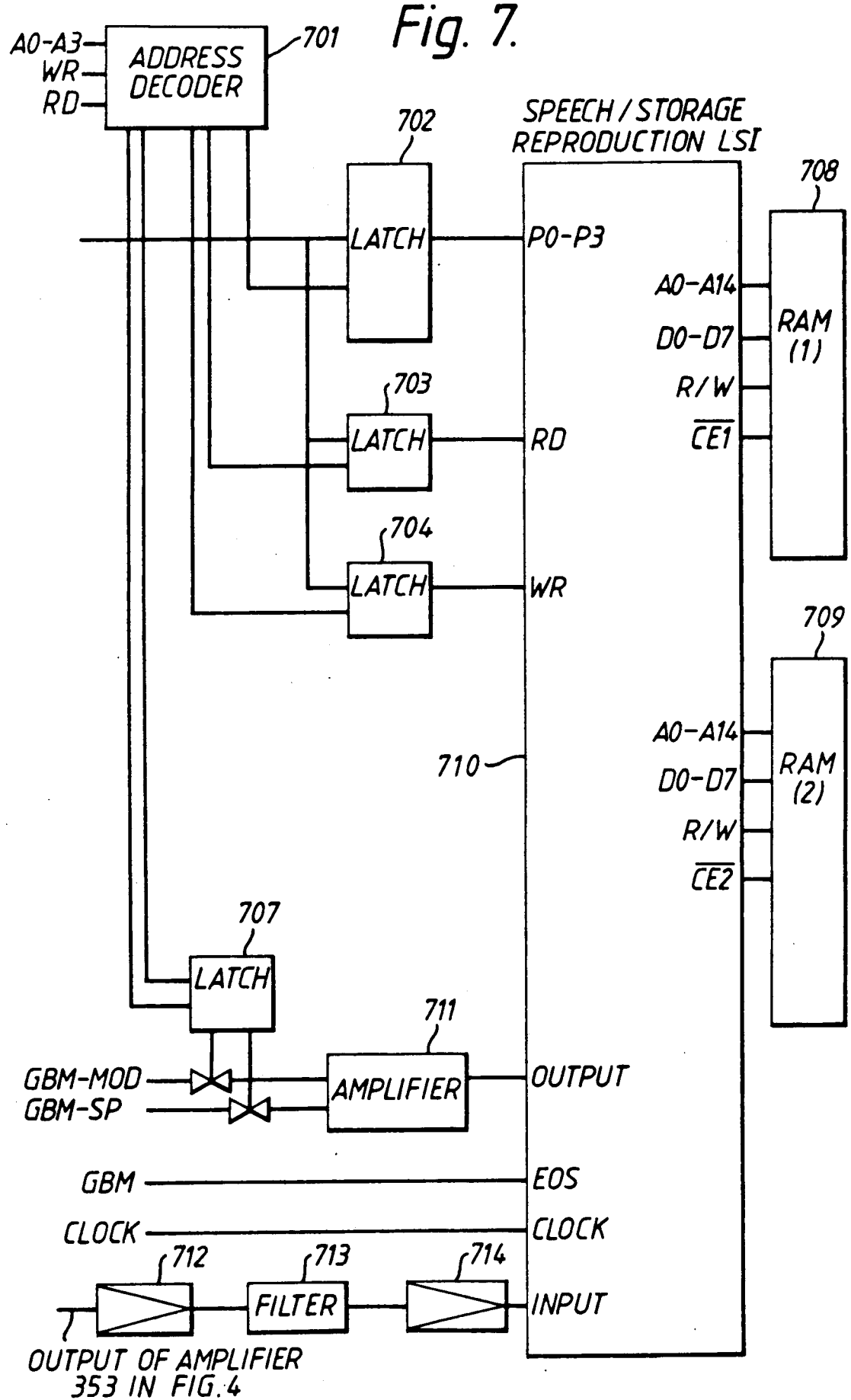
FIG. 7 is a block diagram of a voice dial/response circuit in the radio unit shown in FIG. 3.

Voice dial/response circuit 350 in FIG. 3 mainly comprises two sections, i.e. the voice dial circuit shown in FIG. 4 and the voice response circuit shown in FIG. 7.

1-b-1. Voice dial circuit

FIG. 4 is a detailed block diagram of the voice dial circuit.

Referring to FIG. 4, the voice dial circuit comprises voice recognition circuit 350a for recognizing the words spoken by a human, speech synthesis circuit 350b for synthesizing voice messages, and DTMF receiver 350c for receiving DTMF signals.

Speech recognition circuit 350a comprises balance/unbalance converter 351 (referred to as B/U converter hereinafter) connected to balance line 351a, high-pass filter 352, amplifier 353, AGC circuit 354, attenuator 356, speech recognition LSI 357, RAM 358, latches 359 and 360, gate circuits 361 and 362, and address decoder 363. Speech recognition LSI 357 recognizes speech signals. RAM 358 stores data of word to be recognized in speech recognition LSI 357.

1-b-2. Speech recognition circuit

Figure 5:
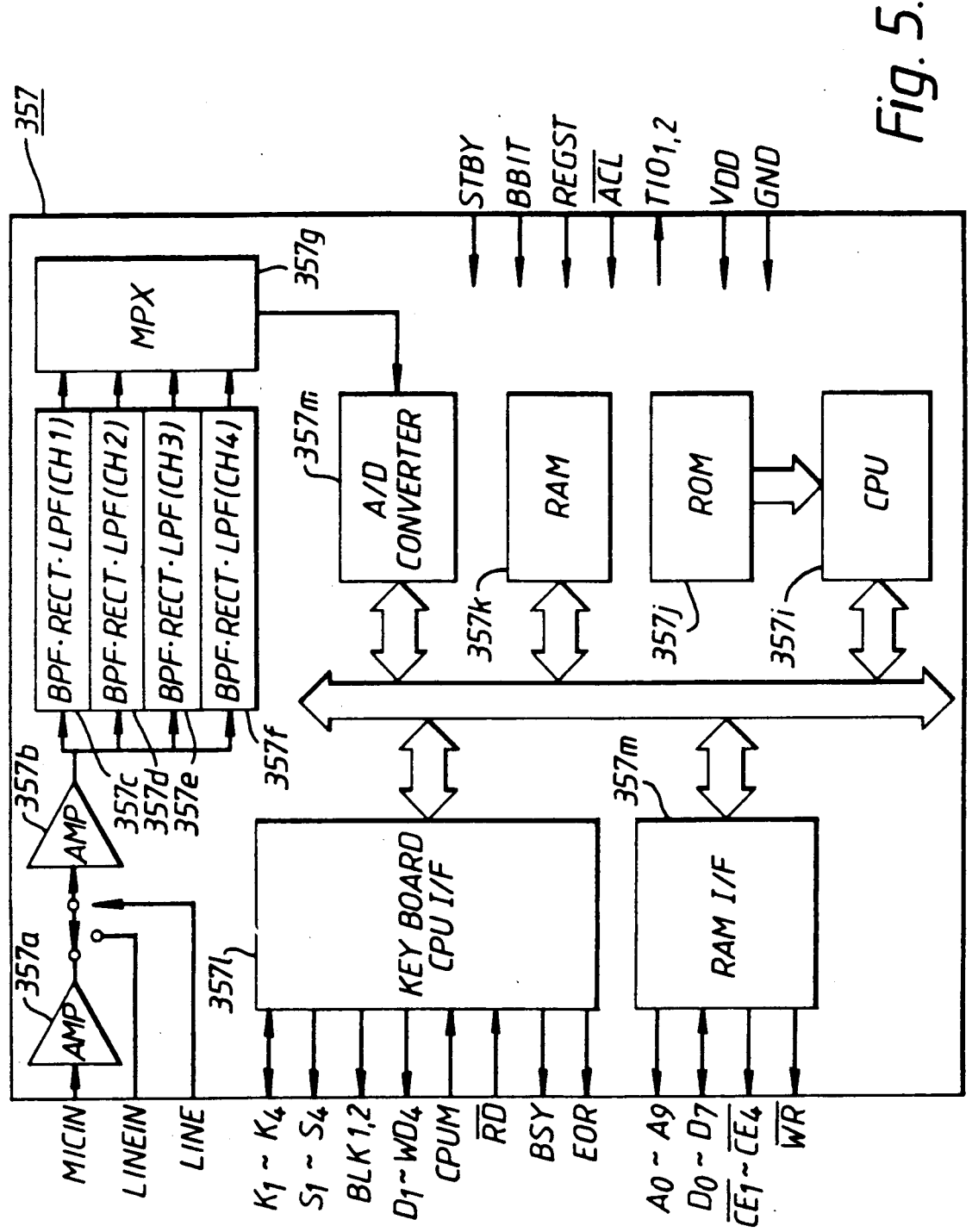
FIG. 5 is a block diagram of a speech recognition LSI in the voice dial circuit shown in FIG. 4.

FIG. 5 is a detailed block diagram of speech recognition LSI 357.

Referring to FIG. 5, speech recognition LSI comprises two amplifiers 357a and 357b, four band-pass filters 357c, 357d, 357e, and 357f, multiplexer 357g, A/D converter 357h, CPU 357i, ROM 357j, RAM 357k, CPU interface 357, and RAM interface 357m.

Amplifiers 357a and 357b amplify the inputted speech signal. The gain value of each of amplifiers 357a and 357b is, for example, 10. Band-pass filters 357c, 357d, 357e, and 357f filter the amplified speech signal. The center frequencies of band-pass filters 357c, 357d, 357e, and 357f are respectively 0.5 kHz, 1 kHz, 2 kHz, and 4 kHz. Multiplexer 357g multiplexes the speech signal filtered through band-pass filters 357c, 357d, 357e, and 357f. A/D converter 357h converts the multiplexed speech signal into a digital signal. CPU 357i controls the overall operations of CPU 357i. ROM 357j stores various kinds of programs to be required for the operation of CPU 357i. RAM 357k stores various kinds of data during control of CPU 357i. CPU interface 357 interfaces communication with audio controller 330. RAM interface 357m interfaces with RAM 358.

At the time of speech recognition, the sampled, quantized, coded speech signal supplied through amplifiers 357a and 357b, band-pass filters 357c, 357d, 357e, and 357f, multiplexer 357g, and A/D converter 357h are temporarily stored in RAM 357k. It should be noted that the head and end positions of one speech pattern are detected by CPU 357i and thereby only speech pattern signals between the head position and the end position are stored in RAM 357k. A sampling rate in which A/D converter 357m converts an analogue signal supplied thereto to a digital signal is fixed. Accordingly the number of data of one speech pattern stored in RAM 357k depends on length of the speech pattern. Next CPU 357i extracts a predetermined number of data (i.e. 16) from data of one speech pattern stored in RAM 357k by skipping data properly, so that the extracted data represent the speech pattern. In other words the supplied speech patterns are normalized in the direction of time. Meanwhile CPU 357i loads registered data from RAM 358 via RAM I/F 357m one speech pattern by one speech pattern. It should be noted that the registered data in RAM 358 corresponding to each speech pattern consist of the above mentioned predetermined number of data. And CPU 357i compares data of one speech pattern from RAM 357k with the corresponding data of one speech pattern from RAM 358 and calculates the sum of differences between them one speech pattern by one speech pattern. After calculating the sum of each speech pattern in RAM 358, CPU 357i determines which speech pattern in RAM 358 is the most similar to the speech pattern from RAM 357k, i.e. a speech pattern which sum is the smallest is selected. And CPU 357i determines whether the sum of the selected one exceeds a predetermined value or not. If the sum of the selected one does not exceed the value, CPU 357i concludes that the speech pattern in RAM 358 is substantially identical to that in RAM 357k and sends signals: K1-K4, BLK1,2 indicative of the register number (address information) of the speech pattern to CPU 331 via gate circuit 361,362. Otherwise CPU 357i sends signals: K1-K2, BLK1,2 indicative of non-recognition to CPU 331 via gate circuit 361,362.

1-b-3. Speech synthesis cicuit

Speech synthesis circuit 350b comprises speech synthesis LSI 364 for generating a predetermined speech pattern on the basis of the data sent from audio controller 330, latch 365, and amplifier 366 for amplifying the synthesized speech patterns.

Figure 6:
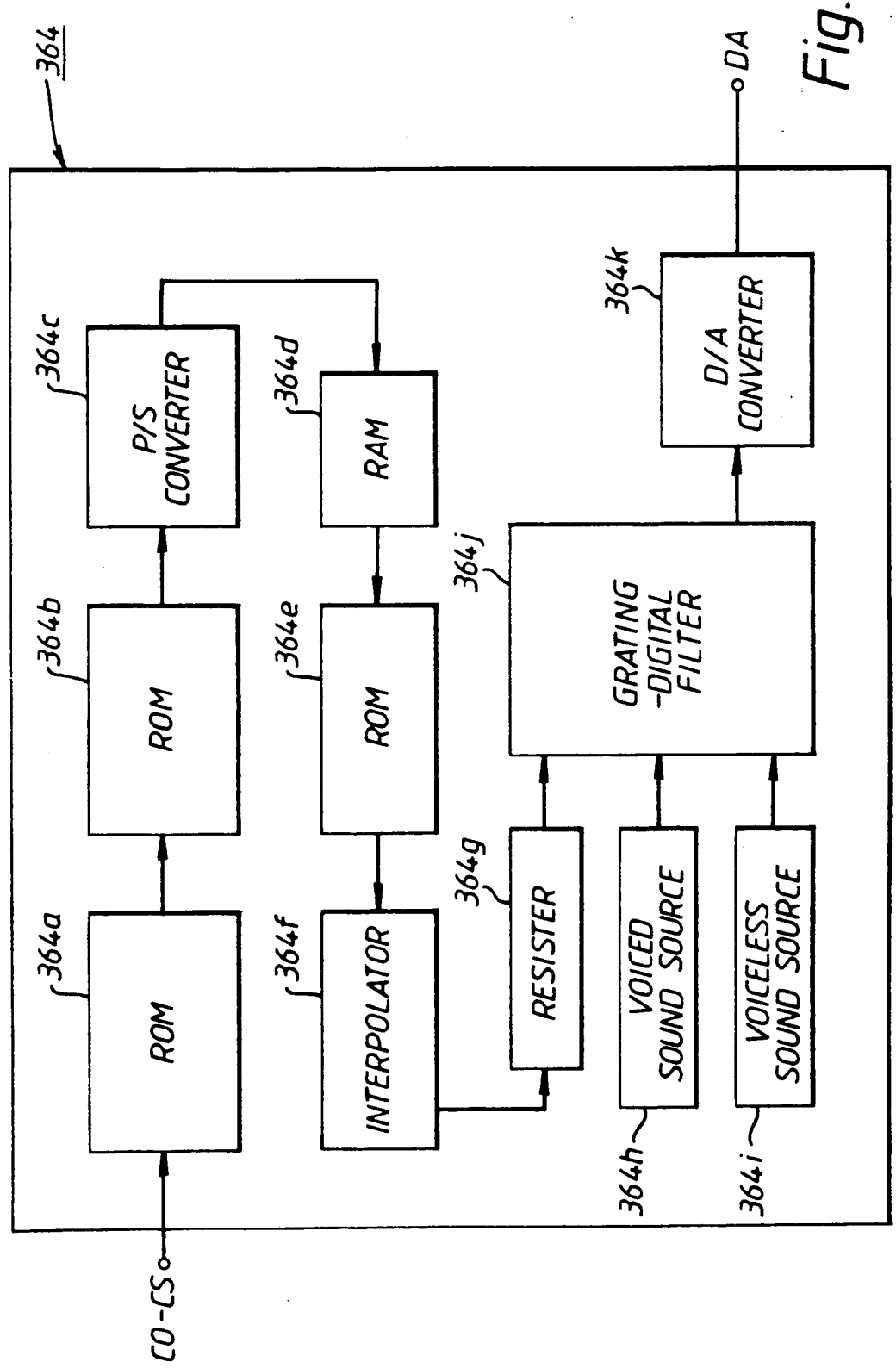
FIG. 6 is a block diagram of a speech synthesis LSI in the voice dial circuit shown in FIG. 4.

FIG. 6 is a further detailed block diagram of the above mentioned speech synthesis LSI 364.

Referring to FIG. 6, speech synthesis LSI 364 comprises ROM 364a indirectly addressed by a predetermined code, ROM 364b for storing speech parameters, parallel/serial converter 364c for converting parallel signals to serial signals, RAM 364d for storing one-frame parameters, ROM 364e for nonlinearly decoding parameters, interpolator 364f for interpolating parameters every predetermined interval, register 364g for storing parameters and performing arithmetic operations, voiced sound source 364h, voiceless sound source 364i, grating digital filter 364j, and D/A converter 364k.

DTMF receiver 350c comprses high-pass filter 367 and DTMF receiver 368. DTMF receiver 368 receives a DTMF signal included in the speech signal through high-pass filter 367 and recognizes the DTMF signal.

1-b-4. Speech response circuit

FIG. 7 is a detailed block diagram of the speech response circuit for storing speech patterns to be reproduced.

Referring to FIG. 7, the speech response circuit comprises address decoder 701 for decoding signals: 'A0-A3', 'WR', and 'RD' from CPU 331, laches 702-707 for temporarily storing signals from address decoder 701 and for providing these signals as 'P0-P3', 'RD', 'WR', 'ACL', and so on, RAM(1) 708 for storing speech pattern data of user spoken words which may be reproduced in the after-mentioned speech registration mode or confirmation mode, RAM(2) 709 for storing speech pattern data of user spoken words which may be reproduced in an automatic response mode, speech storage/reproduction LSI 710 for writing and reading data of the speech pattern, amplifier 711 for amplifying the output of speech storage/reproduction LSI 710, amplifier 712 for amplifying signals applied thereto, filter circuit 713 for filtering the output of amplifier 712, and amplifier 714 for amplifying the output of filter circuit 713 and for providing the amplified output to speech storage/reproduction LSI 710. The output of amplifier 353 (FIG. 4) is applied to the input of amplifier 712. And 'EOS' represents end of speech. CLOCK means clock signals (e.g. 512 KHz)

1-b-5. Speech storage/reproduction LSI

Figure 8:
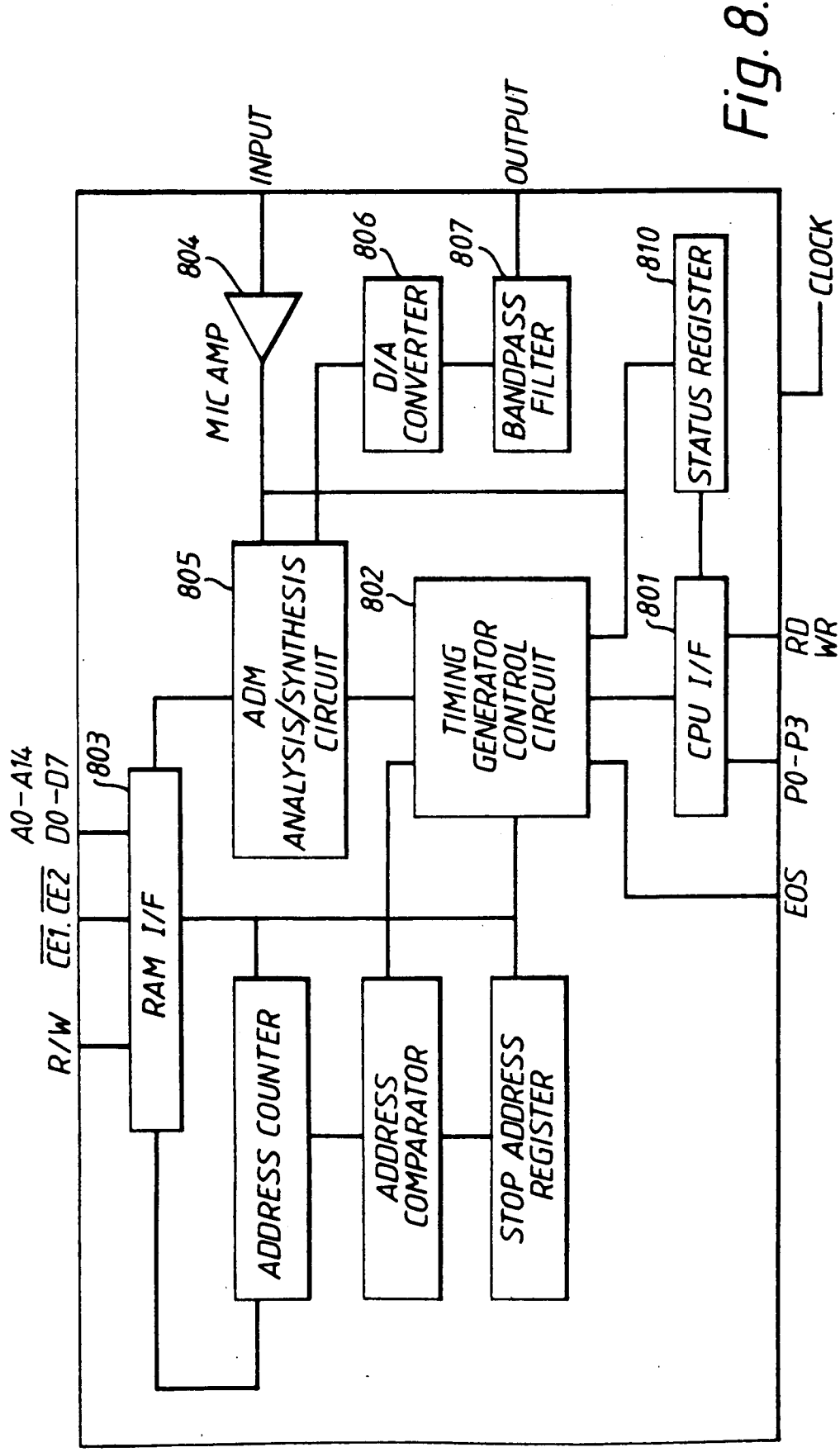
FIG. 8 is a block diagram of a speech storage/reproduction LSI in the voice response circuit shown in FIG. 7.

FIG. 8 is a detailed block diagram of the speech storage/reproduction LSI.

In case of storing speech signals, a signal: WR and an address signal indicative of locations for speech data to be stored are sent from CPU 331 to CPU I/F 801. Responsive to these signals, timing generator control circuit 802 accesses the locations addressed by the address signal in RAM 708 or 709 (FIG. 7) via RAM I/F 803. A speech signal applied to INPUT is amplified at MIC AMP 804 and analized by adaptive delta modulation (ADM) method in ADM analysis/synthesis circuit 805. An analyzed speech signal is sequentially sent to the RAM 708 or 709 and stored in the addressed locations. The end of speech signal may be identified by signal: EOS from CPU 331.

In case of reproducing speech signals, signal: RD and start and end address signals are sent from CPU 331 to CPU I/F 801. Responsive to these signals, timing generator control ciruit 802 sets the end address in stop address register and accesses the locations addressed by the start address signal in RAM 708 or 709 via RAM I/F 803. Data in the accessed location are loaded into ADM analysis/synthesis circuit 805 via RAM I/F 803. ADM analysis/synthesis circuit 805 synthesizes a digital speech signal in response to the loaded data. The output of ADM analysis/synthesis circuit 805 is applied to D/A converter 806 and converted into an analogue speech signal therein. The analogue signal is outputted via bandpass filter 807. The address of accessed location is contiguously incremented by address counter until it equals to the end address set in stop address register. Thereby speech data in RAM 708 or 709 may be sequentially loaded into speech storage/reproduction LSI 710 and a speech signal may be reproduced.

1-d. Telephone set

Figure 10:
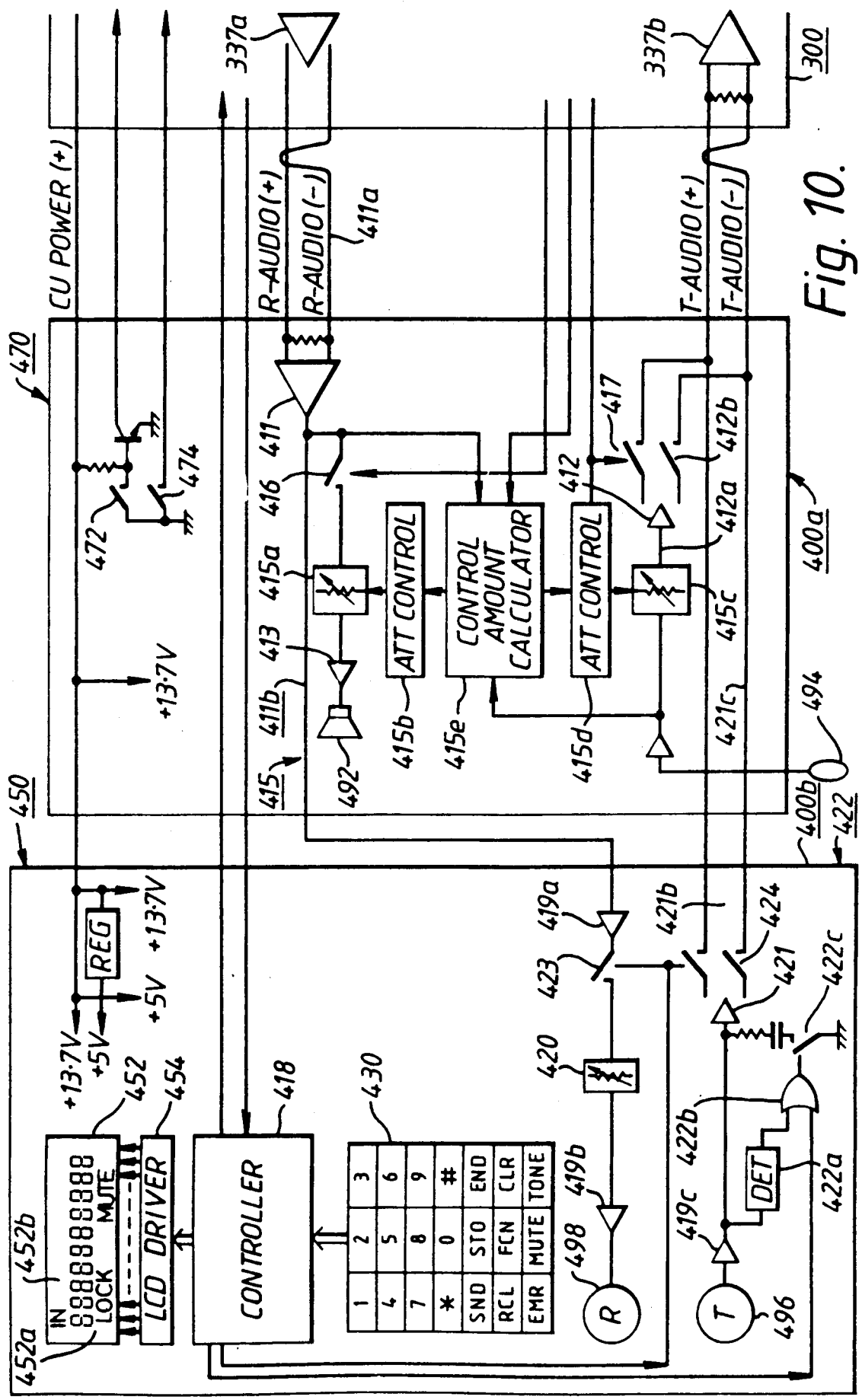
FIG. 10 is a circuit diagram of a telephone set.

FIG. 10 is a further detailed view of the telephone set 400 described above.

Referring to FIG. 10, main unit 400a mainly comprises audio controller 410, speech input/output unit 490, and switch unit 470. Controller 410 comprises B/U converter 411, U/B converter 412, amplifiers 413 and 414, echo canceler 415, and switches 416 and 417. Speech input/output unit 490 comprises hands-free microphone 494 and loudspeaker 492. Switch unit 470 comprises hook switch 472 and on/off switch 474.

B/U converter 411 converts the speech signals sent from audio circuit 337 in radio unit 300 through balance line 411a into signals on unbalance line 411b. The speech signal converted into the signals on unbalance line 411b are amplified by amplifier 411b and outputted via loudspeaker 492. Since the speech signal outputs from the audio circuit in the radio unit are the signal on the unbalance line, the speech signals are converted into the signals on the balance line by U/B converter 337a arranged in the immediated output stage of the audio circuit. The speech signal inputted at hands-free microphone 494, amplified by amplifier 414, and appearing on unbalance line 412a are converted into signals on balance line 412b. The speech signals converted into the signals on balance line 412b are sent to audio circuit 337 through balance line 412b. The speech signal inputs to audio circuit 337 in radio unit 300 are signals on the unbalance line, so that the speech signals are converted into signals on the unbalance line by B/U converter 337b arranged in the immediate output stage of audio circuit 337.

Echo canceler 415 comprises attenuator 415a for attenuating the speech signal input from B/U converter 411 to amplifier 413, attenuation controller 415b for controlling an attenuation rate of attenuator 415a, attenuator 415c for attenuating the speech signal input from the amplifier 414 to U/B converter 412, attenuation controller 415d for controlling an attenuation rate of attenuator 415c, and control amount calculator 415e for calculating control amounts of attenuation controllers 415b and 415d on the basis of the speech signal on the respective lines. Switch 416 is operated to determine whether the speech signal from B/U converter 411 is output from loudspeaker 492. Switch 417 is operated to determine whether the speech signal from hand-free microphone 494 is sent to audio circuit 337 in radio unit 300. The operations of switches 416 and 417 are performed on the basis of control signals output from audio controller 330. Hook switch 472 detects the on- or off-hook state of handset 400b. The detected signal is sent to audio controller 330 in radio unit 300. On/off switch 474 performs overall ON/OFF operation of mobile telephone apparatus 100. A switching signal from switch 474 is sent to audio controller 330 in radio unit 300.

Handset 400b comprises audio controller 410, display unit 450, key unit 430, and speech input/output unit 490. Audio controller 410 comprises controller 418, amplifiers 419a, 419b, and 419c, an attenuator 420, U/B converter 421, speech switch unit 422, and switches 423 and 424. Display unit 450 comprises liquid crystal display 452 and LCD driver 454. Key unit 430 comprises a plurality of key pads. Speech input/output unit 490 comprises handset microphone 496 and handset receiver 498. Controller 418 controls the overall operations of handset 400b on the basis of control signals sent from audio controller 330 in radio unit 300. At the same time, controller 418 sends controls signals or the like input from key unit 430 to audio controller 330 in radio unit 300. Amplifiers 419a and 419b amplify the speech signal sent from the B/U converter 411 in main unit 400a. Attenuator 420 attenuates the speech signals amplified by amplififers 419a and 419b. The speech signal output through amplifier 419a, attenuator 420, and amplifier 419b is outputted from handset receiver 498. Amplifier 419c amplifies the speech signal input from handset microphone 496. U/B converter 421 converts the amplified speech signals on unbalance line 421a into signals on balance line 421b. The speech signal converted into the signal on balance line 421b is sent to audio circuit 337 through balance line 421b and balance line 421c on unit 400a. Switch 423 is operated to determine whether the speech signal from B/U converter 411 is to be outputted from handset receiver 498. Switch 424 is operated to determine whether the speech signal from handset microphone 496 is to be outputted to audio circuit 337 in radio unit 300. The operations of switches 423 and 424 are performed on the basis of the control signal output from controller 418 and are interlocked with switches 416 and 417 in main unit 400a. In the standby mode of mobile telephone apparatus 100, all switches 416, 417, 423 and 424 are turned off. In the sound generation mode for a key input, switch 416 is turned on, and switches 417, 432, and 424 are turned off. When handset 400b is used for communication in the off-hook state, switches 423 and 424 are turned on, and switches 416 and 417 are turned off. When handset 400b is used for communication in the on-hook state, switches 416 and 417 are turned on, and switches 423 and 424 are turned off. Speech switch unit 422 comprises level detector 422a, OR gate 422b, and switch 422c. Level detector 422a detects a signal level of a speech signal input to handset microphone 496. If the signal level is less than a predetermined value, level detector 422a generates a signal of level "L". However, if the signal level exceeds the predetermined value, level detector 422a generates a signal of level "H". OR gate 422b receives an output signal from level detector 422a and a predetermined control signal output from controller 418 and generates an OR signal. Switch 422c is turned on in response to the signal of level "L" from OR gate 422b, and speech signal line 421a is grounded. The speech signal from handset microphone 496 is not transmitted to audio circuit 337, and handset microphone 496 is set in the OFF state. Switch 422c is turned off in response to the signal of level "H" from the OR gate 422b, and the handset microphone 496 is set in the ON state. The control signal input from controller 418 to one input terminal of OR gate 422b is set at level "L" in the standby mode and during normal communication and at level "H" in the voice recognition mode allowing voice dialing (to be described later). Therefore, when no voice is inputted to handset microphone 496 in the busy state, handset microphone 496 is set in the OFF state. Therefore, noise in automobile 500 is not sent to the other party, thereby comfortable communication can be achieved. In the recognition mode for voice dialing handset microphone 496 is normally set in the ON state and is operated independently of swiching of level detector 422a. In order to prevent discomfort caused by frequent switching operations according to voice inputs in the busy state, level detector 422a has a capacitor (not shown) for setting a predetermined constant. Liquid crystal display 452 comprises a numerical display element 452a having several dispaly digit positions and dispaly element 452b for displaying various functions. LCD driver 454 drives liquid crystal display 452 under the control of controller 418 to display predetermined contents. Key unit 430 includes key pads such as numerical keys "0" to "9" as well as function keys "*", "#", "SND", "STO", "END", "RCL", "FCN", "CLR", "EMR", "MUTE", and "TONE". When a desired key pad is depressed, the depressed pad is detected by controller 418.

2. Operations of mobile telephone

Operations of mobile telephone apparatus 100 having the above arrangement will be described in detail with reference to the flow charts.

2-a. Begining of the operation

A connection control operation of mobile telephone apparatus 100 will be described with reference to FIG. 11.

When ON/OFF switch 474 in switch unit 470 in telephone set 400 is turned on, the respective components are powered by power source 390 (step 1101).

Figure 12:
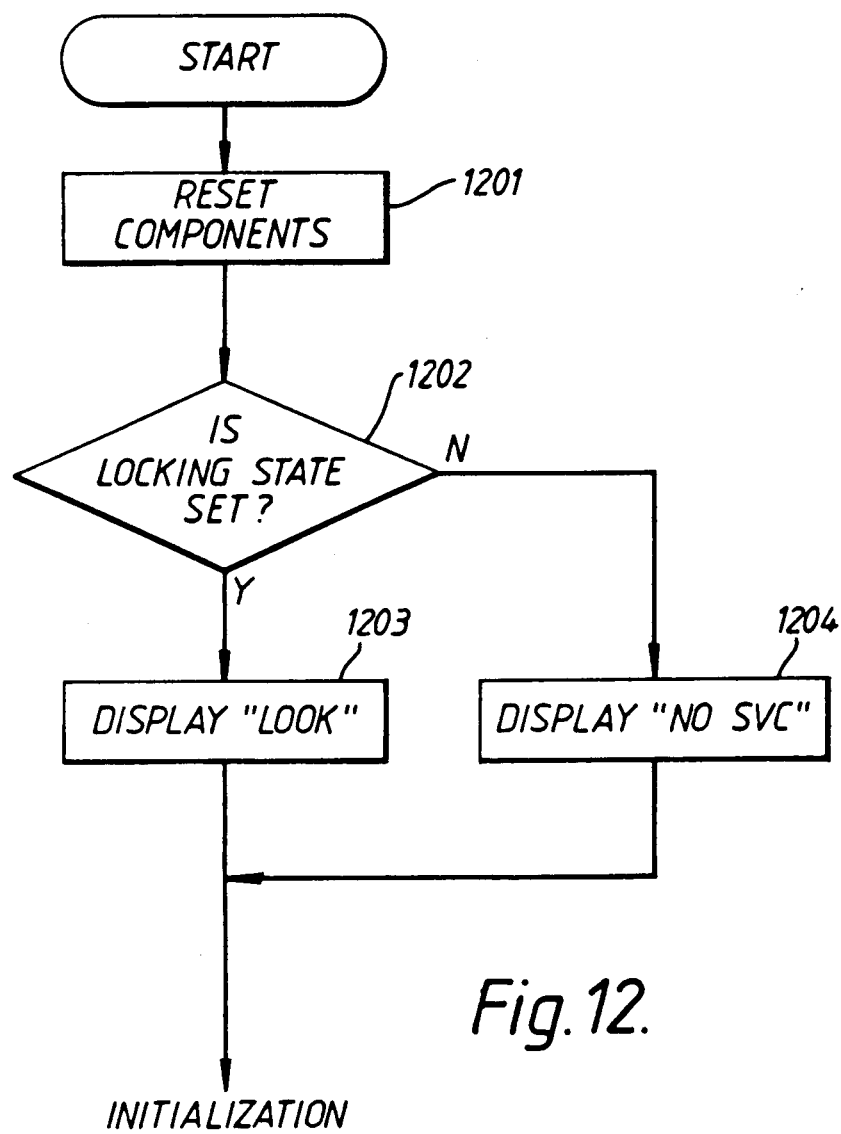
FIG. 12 is a flow chart for explaining a connection control operation.

FIG. 12 is a detailed flow chart for explaining the above operation.

When the apparatus is powered, the components are reset (step 1201). When resetting of the components is completed, the entire screen of e.g., liquid crystal display 452 flickers. Alternatively, a predetermined "beep tone" is generated via loudspeaker 492 to signal to the user that resetting has been completed.

Thereafter, whether a locking state is set is determined (step 1202). The locking state is defined as a state wherein no subsequent operations can be performed unless a predetermined key operation in the unit 430 is performed, thereby preventing illegal use of the apparatus.

When the locking state is set, liquid crystal display 452 displays "LOCK" (step 1203). Otherwise, liquid crystal display 452 displays "NO SVC" (step 1204).

When the above resetting operations are completed, eaxecution of initialization routine is started (step 1102).

2-b. Channel seizure

Figure 13:
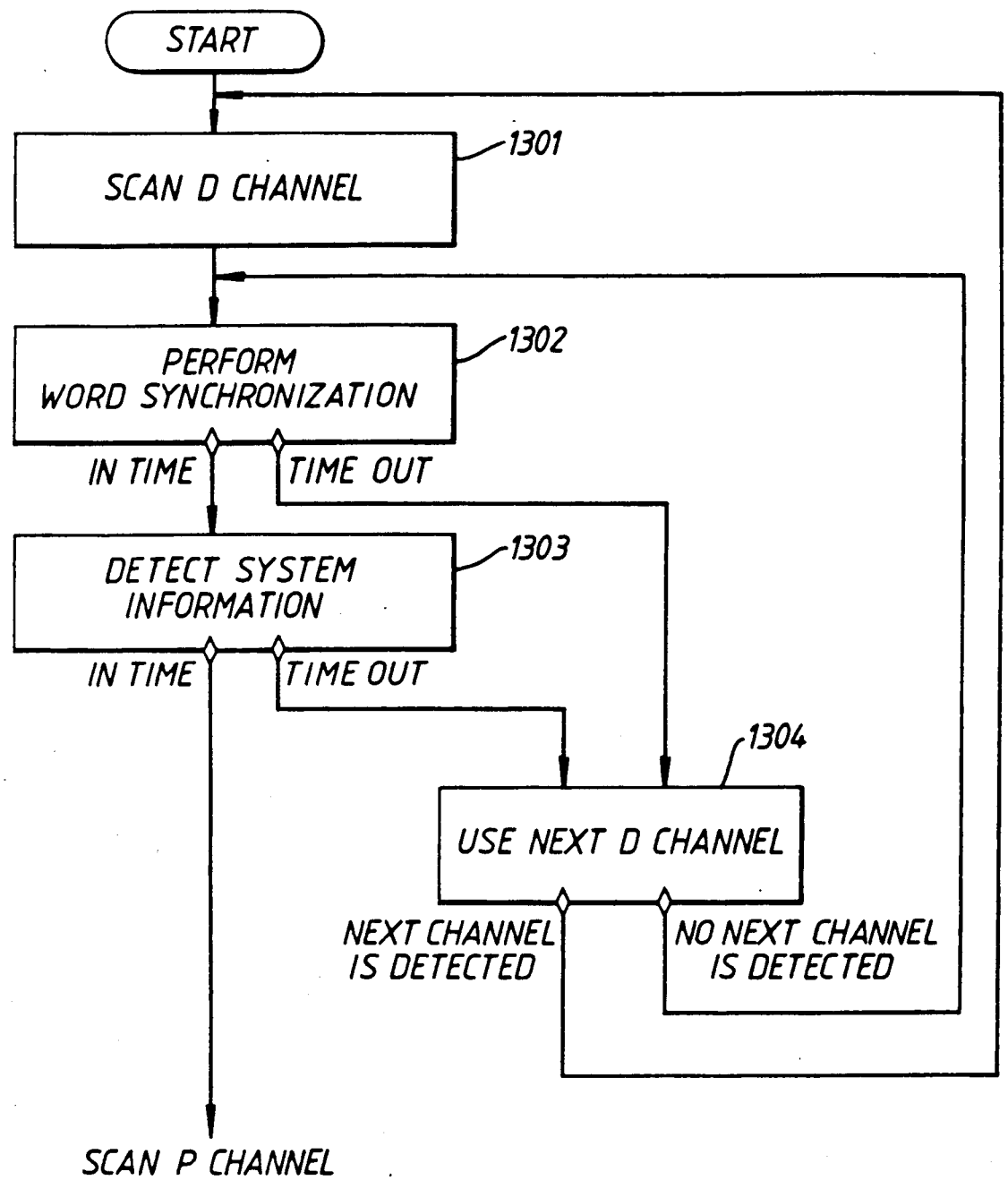
FIG. 13 is a flow chart for explaining initialization in the connection control operation.
Figure 14:
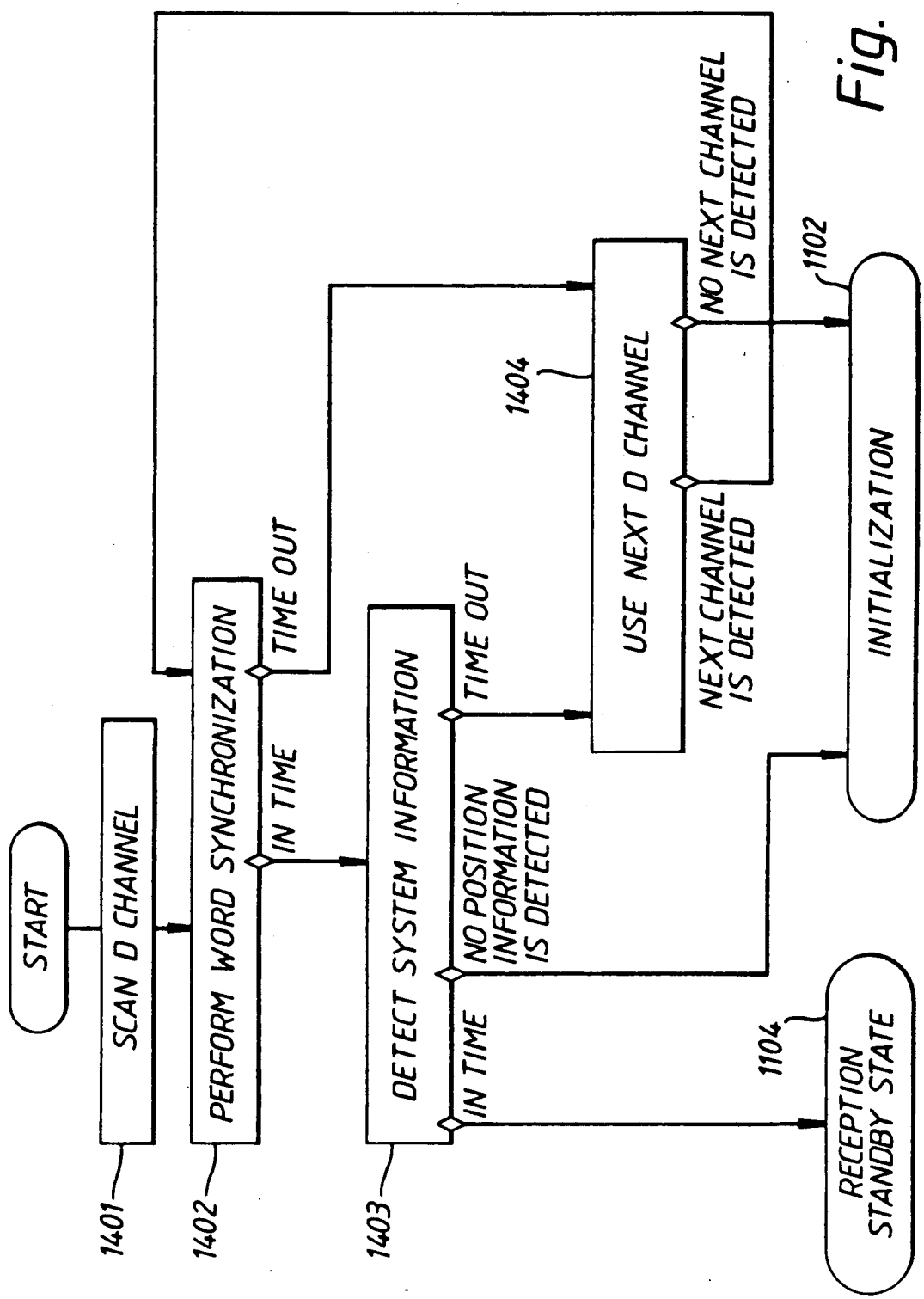
FIG. 14 is a flow chart for explaining an operation after initialization in the connection control operation.

FIG. 13 is a detailed flow chart of initialization.

More specifically, audio controller 330 in radio unit 300 causes demodulator 312 to scan predetermined control channels (to be referred to as D channels hereinafter) to obtain the information indicative of electric field intensity of the received signals over each channel (step 1301). The channel having the strongest electric field intensity is selected from the D channels and the apparatus is ready for receiving signals through the D channel having the strongest electric field intensity. In this case, information representing the D channel having the second strongest intensity is also obtained.

Thereafter, control signal processor 338 performs bit and frame synchronization operations on signals through the selected D channel (step 1302). System information is then detected from signals through this D channel (step 1303).

If the word synchronization or system information reception is not performed when a predetermined period of time has elapsed, the D channel having the second strongest intensity is used to repeat the above operation (step 1304). In this case, if word synchronization or system information reception is not performed again when the predetermined period of time has elapsed, the demodulator scans the D channels again.

Figure 11:
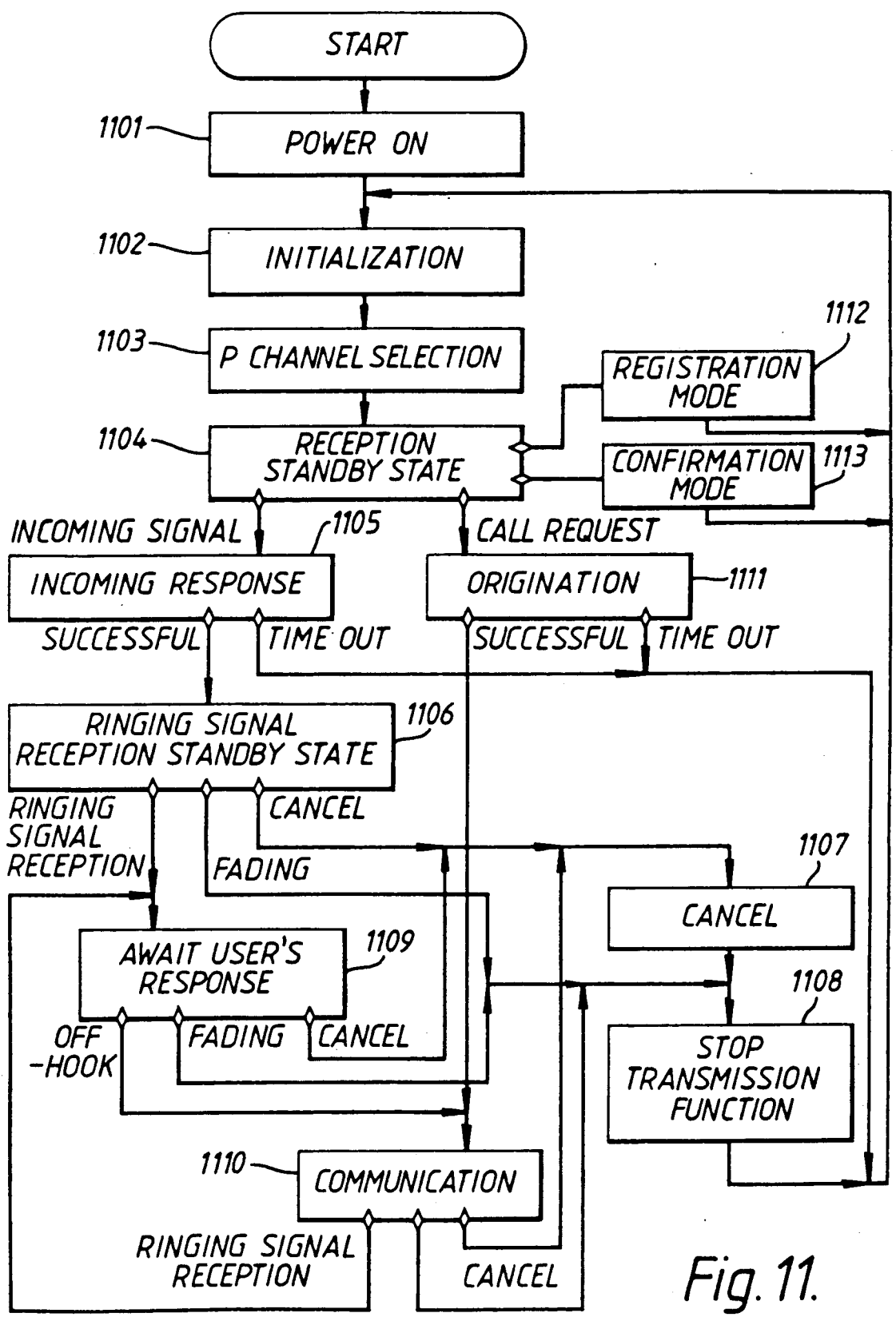
FIG. 11 is a flow chart for explaining a connection control operation.

When the above initialization operations are completed, scanning similar to the above scanning operation is performed for control channels (to be referred to as P channels hereinafter) for receiving an incoming signal, as shown in FIG. 11 (step 1103).

Audio controller 330 in radio unit 300 causes demodulator 312 to scan each P channel (step 1401) to obtain the information indicative of electric field intensity of the received signals. The apparatus is ready for receiving information through the P channel of the strongest electric field intensity. In this case, information of the P channel having the second strongest intensity is also obtained.

Thereafter, control signal processor 338 performs bit and frame synchronization operations on signals through the P channel which has the strongest electric field intensity (step 1402), and system information is obtained by way of the P channel (step 1403).

If the word synchronization or system information reception is not performed when a predetermined period of time has elapsed, the operation similar to the one described above is performed for the P channel having the second strongest intensity (step 1404). In this case, when word synchronization or system information reception is not performed again within the predetermined period of time, initialization is resumed (step 1102). If position information is not obtained from system information, initialization is also resumed (step 1102).

The above connection control operations set the apparatus in the standby mode (step 1104).

In the standby mode, when an incoming siganl is received through the P channel, an acknowledge signal is sent back through a predetermined channel (step 1105). At the same time, scanning of control channels (to be referred to as A channels hereinafter) for receiving control signals from the base station is performed in the same manner as in D and P channels.

Audio controller 330 in radio unit 300 causes demodulator 312 to scan each A channel to obtain the information indicative of electric field intensity of the received signal. The apparatus is then ready for receiving information through the A channel having the strongest electric field intensity. Thereafter, control signal processor 338 performs bit and frame synchronization operations, i.e., word synchronization. When a speech channel designation signal is received through this A channel, the channel is switched to the designated speech channel (step 1107). The apparatus then waits to receive a ringing signal in this speech channel (step 1106). When the on-hook state is set in this reception state, the reception mode of this speech channel is canceled (step 1107), and the transmission function is disabled (step 1108).

Thereafter, when the ringing signal is received through the speech channel, the apparatus waits for a user's response operation (step 1109).

When the user depressed the off-hook key or the "SEND" key, communication link is established (step 1110). When communication is completed, the reception mode of the speech channel is canceled (step 1107) and the transmission function is disabled (step 1108). When a ringing signal is received during cummunication, the apparatus waits again for the user's response operation (step 1109).

When fading occurs for a predetermined period of time or longer in the speech channel reception mode (step 1106), the acknowledge signal sending state (step 1104) or a communication enable state (step 1110), the transmission function is disabled (step 1108).

When the transmission function is disabled (step 1108), initialization is resumed (step 1102).

2-c. General description of call origination

Call origination processing will be described. The origination is performed in the reception enable mode in the same manner as in the incoming call (steps 1104 and 1111).

Figure 15:
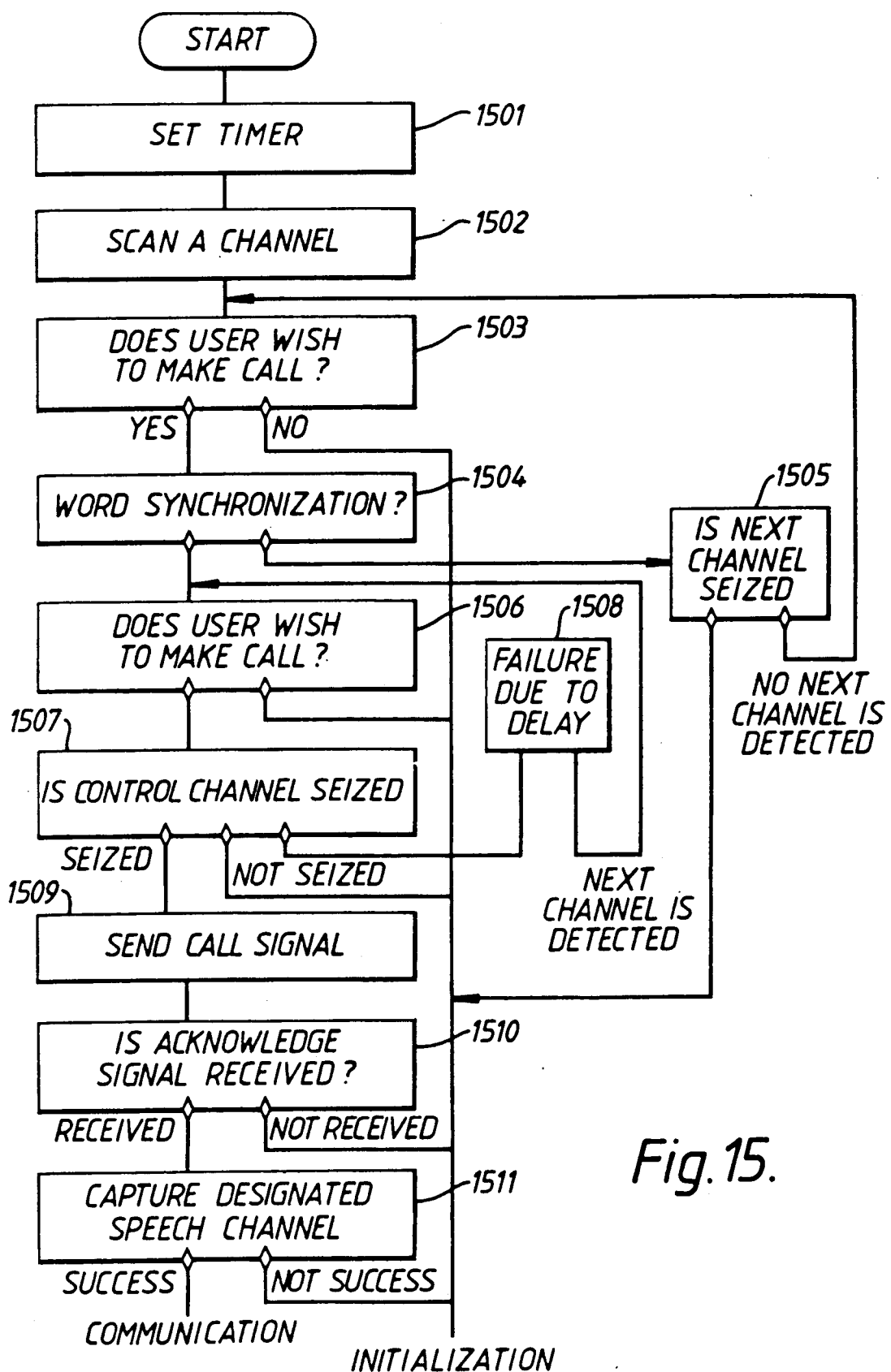
FIG. 15 is a flow chart showing operations in case of a call origination.

FIG. 15 is a detailed flow chart showing outgoing call processing.

When a call request is detected by an input at key unit 430 or voice dialing (to be described later), a timer for counting a call reception time is set (step 1501). The set time is, e.g., 12 seconds.

Thereafter, the audio controller in the radio unit causes the demodulator to scan each predetermined control channel (step 1502) to obtain the information indicative of electric field intensity of the received signals over each channel. And the channel having the strongest electric field intensity is selected from these control channels and the apparatus is set to receive signals through the control channel having the strongest intensity. In this case, information of the control channel having the second strongest electric field intensity is also obtained.

Next, the presence of the user wishing to make a call is checked (step 1503). This check is performed as follows. If the user enters a telephone number to be called and depresses the "SEND" key, a call flag is set at logic "1". In this case, the apparatus determines that the user wishes to make a call. However, if the user depresses the "END" key after depression of the "SEND" key, the call flag is set at logic "0". In this case, the apparatus determines that the user does not wish to make a call, and initialization is resumed (step 1102).

The control signal processor performs bit and frame synchronization operations of the currently received control channel, that is, word synchronization thereof to obtain system information from this control channel (step 1504). However, if word synchronization cannot be performed, the same operation is performed using the control channel having the second strongest intensity (step 1505). In this case, if no word synchronization can be performed, initialization is resumed (step 1102).

And then, the apparatus confirms again whether the user wishes to make a call (step 1506). As described above, if the call flag is set a logic "1", the apparatus determines that the user wishes to make a call. However, if the call flag is set at logic "0", the apparatus determines that the user does not wish to make a call and initialization is resumed (step 1102).

The mobile telephone aparatus 100 confirms whether the selected control channel is appropriate or not for origination signal to be broadcasted by analysing the system information signal from a base station. Upon the selection of an appropriate control channel, a channel selection flag is changed from logic "0"to logic "1". However, if any appropriate control channel are not be selected, initialization is resumed (step 1102) without changing the content of the channel selection flag. If the selection of an appropriate control channel is delayed (step 1508), the apparatus checks again whether the user wishes to make a call or not (step 1506).

If the mobile telephone apparatus detects that the user wishes to make a call (i.e., the call flag is set at logic "1") and an appropriate control channel for broadcast of an origination signal is selected (i.e., the channel selection flag is set at logic "1"), an origination signal including at least the telephone number to be called, which is entered by the user, is broadcasted over this control channel (step 1509).

Thereafter, the mobile telephone apparatus detects that the acknowledge signal from the base station has been received or not (step 1510). And the base station calls up the other party to be called on the basis of the telephone number included in the origination signal.

And then, communication link may be established between the mobile telephone apparatus and the other telephone apparatus (step 1511). Otherwise, initialization is resumed (step 1102).

Thus communication link can be established as mentioned above (step 1110), and thereafter the communication is closed.

2-d. Voice dial function

The voice dialing function of mobile telephone apparatus 100 will be described in detail.

2-d-1. Registration mode

Figure 16A:
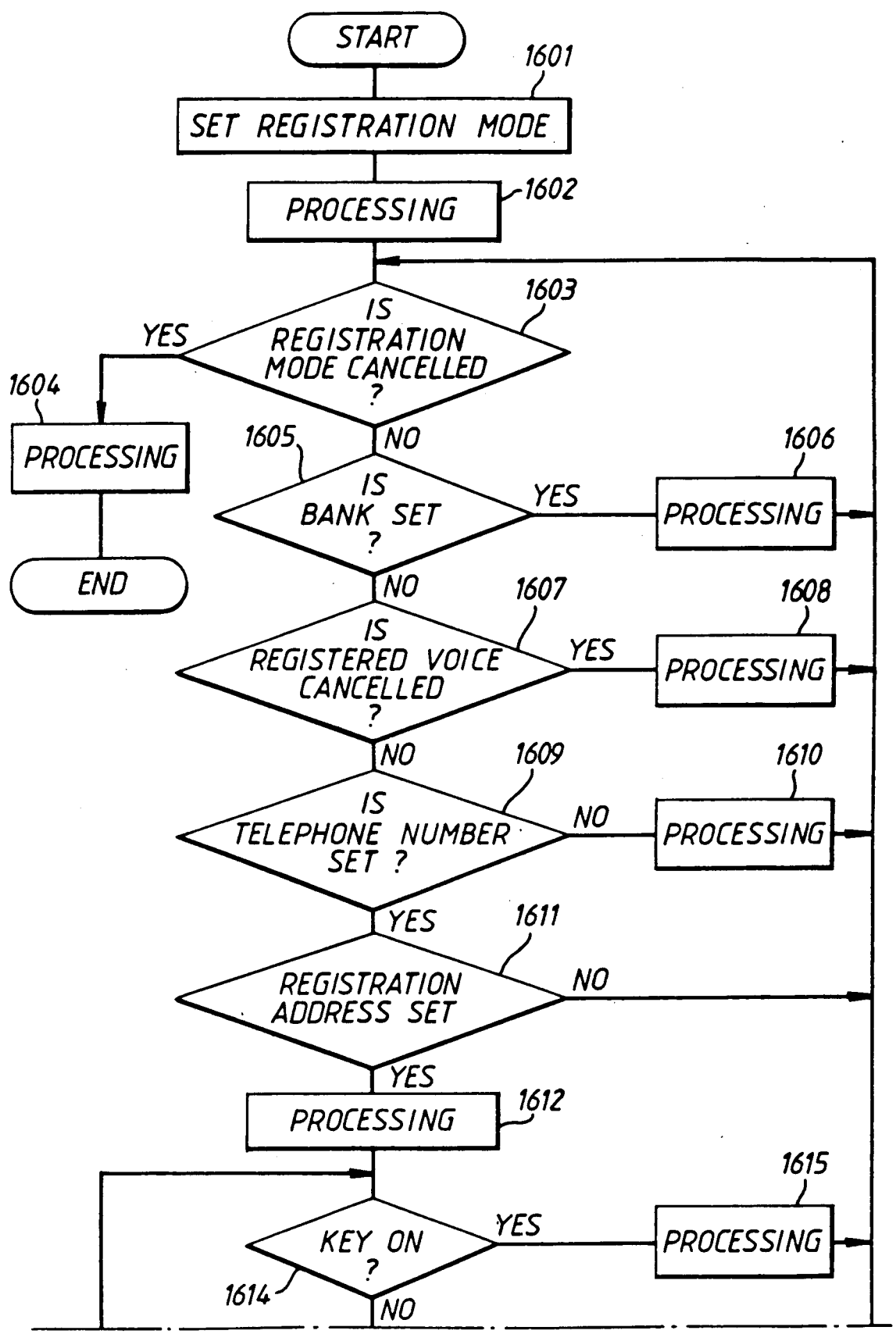
FIG. 16 is a flow chart showing operations in registration mode.
Figure 16B:
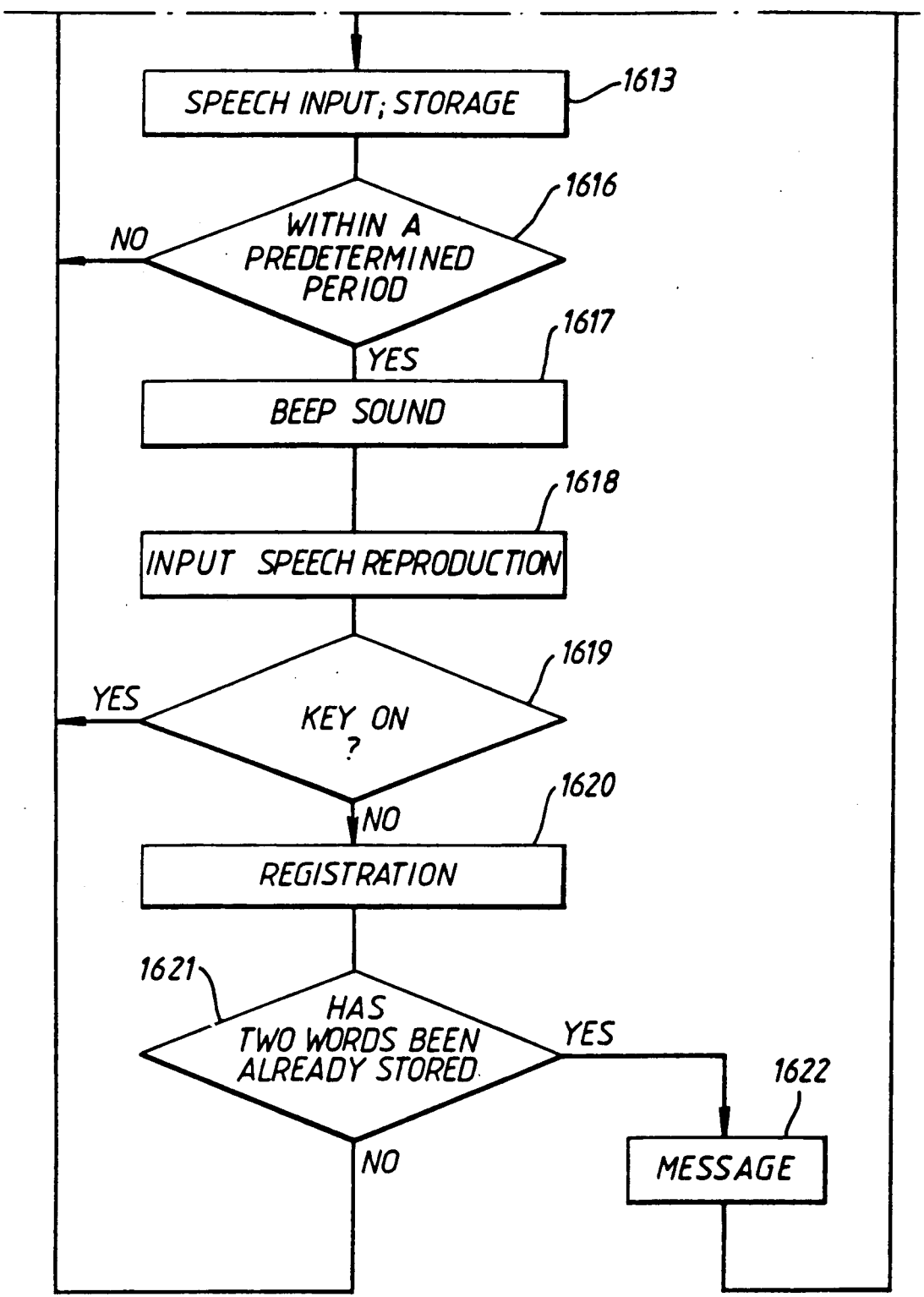

When voice dialing in mobile telephone apparatus 100 is performed, the telephone numbers of the third party to be dialed must be registered in advance. FIG. 16 is a flow chart to show such a registration operation. The registration operation will be described below with reference to the flow chart.

Operations may enter a registration mode (step 1112 in FIG. 11, step 1601 in FIG. 16) from the standby state (step 1104 in FIG. 11) by predetermined key operations at the key unit 430. For example, the user depresses the "CLR", "X", "y", "Z", "FUNC", "#", and "5" keys to set the registration mode. "X", "Y", and "Z" consitutue an unlocking code, i.e., a personal indentification code registered by the user or the like. The unlocking code prevents registration by unauthorized user and damage to the registered data.

When the registration mode is set, the primary function as a telephone function of mobile telephone apparatus 100 is temporarily interrupted. In other words, an incoming call cannot be received by mobile telephone apparatus 100, and an outgoing call cannot be made thereat. Therefore, registration operations are not interrupted by an incoming call or an call origination, and an accurate registration may be performed. In the registratin mode, a display content "LOCK" flickers and a display content "PWR" is lit (step 1602).

The mobile telephone apparatus then checks whether the registration mode is canceled (step 1603). This can be achieved by predetermined key operations at the key unit 430. For example, in order to cancel the registration mode, the "FUNC" and "CLR" keys are depressed (step 1604). It should be noted that the components of the apparatus are reset (step 1101) when the registration mode is canceled. However, if the registration mode is not canceled, this mode is continuously set.

The mobile telephone apparatus checks whether a "bank" function is set or not in the registration mode (step 1605). This setting can be performed by predetermined key operations at key unit 430. For example, the "bank" is set by depressing the "RCL", "#", and "X" keys (step 1606). In this case, the "X" key is the "1" or "2" key, and the "3" to "9", "0", "#", and "*" keys are used as inhibition keys. It should be noted that "bank" setting indicates that data to be registered (i.e., telephone numbers) may be divided into a plurality of groups and voice recognition in voice dialing (to be described later) may be performed in units of groups (banks). If "X" is "1" in "bank" setting, registration is performed in "bank 1". However, if "X" is "2", registration is performed in "bank 2". In voice recognition, when "bank 1" is designated, voice recognition is performed on the basis of data registered in only "bank 1". However, if "bank 2" is designated, voice recognition is performed on the basis of data registered in only "bank 2". With performing such bank setting, voice dialing can be performed on the data registered by a plurality of voices and a plurality of users in one mobile telephone apparatus 100. Therefore, voice dialing can be performed quickly and accurately. Alternatively, a single user may use "banks" according to predetermined conditions, e.g., business/private banks, thereby improving convenience in voice dialing.

The mobile telephone apparatus then checks whether the registered data of the other party subjected to voice dialing is to be canceled (step 1607). If cancel key is not operated, canceling is not performed. In order to perform such canceling, the mobile telephone apparatus 100 is set in the entire cancel mode or in the individual cancel mode. The entire cancel mode is set upon sequential depression of the "STO", "#", and "0" keys. In the entire cancel mode, all data of the parties to be called by voice dialing, that is, telephone number data and corresponding to registered voice data are canceled (erased). Therefore, data prior to entire canceling is not left in the "banks" by entire canceling, thus preventing dialing errors caused by data left unerased in the "bank". The individual cancel mode is set upon sequential depression of the "STO", "X", and "Y" keys. "X" and "Y" are registration address data assigned to the parties subjected to voice dialing. A registered telephone number which is rarely used or unnecessary can be erased individually.

A telephone number of a party subjected to voice dialing is set (step 1609). This can be performed by predetermined key operations at the key unit 430 (step 1610). For example, the telephone number is inputted by depressing the numerical keys, i.e., the "0" to "9" keys. Alternatively, if the telephone number is set in an abbreviated form, the user must depress the "RCL" key and then enter the corresponding telephone number by depressing the "0" to "9" keys. The input telephone number is displayed on liquid crystal display 452 and is checked by the user.

A registration address (register number) for the telephone number set as described above is set (step 1611). This may be performed by predetermined key operations at key unit 430 (step 1612). For example, the user sequentially depresses the "STO", "X", and "Y" and sets registration addresses indicated by the "0" to "9" keys. When the registration address has been set, a predetermined tone is outputted from loudspeaker 492. The user may know that a two-digit address corresponding to a 9-digit telephone number has been registered.

When the predetermined tone is produced, the name, the company name, and the like of the party corresponding to the telephone number set as described above are registered with a user spoken word (step 1613). In this case, when the user depresses one of the keys in key unit 430 (step 1614), operations return to the registration mode setting state (steps 1615 and 1603).

Even when the user utters wrong words, the initial state for registration mode setting may be set upon depression of any key for a predetermined period of time or more (e.g., one second or more).

While a telephone dial number, a corresponding registration address (a register number), and a corresponding voice are sequentially inputted in the above mentioned embodiment, a voice corresponding to a registration address may be inputted on the basis of the registration address after a telephone dial number and the registration address corresponding to the telephone dial number have been inputted another time.

2-d-1' Voice response in speech registration mode

When the first utterance of the user is made, e.g., when the user utters "office", the beep tone is generated twice if the utterance time falls within a predetermined period (e.g. one second) (step 1616 and 1617). Generation of two succeeding beep tones indicates that the first user utterance has been accepted. Next the user spoken word stored in speech storage/reproduction LSI 710 is reproduced (step 1618). Thereby the user may confirm that his utterance is accurately received by the apparatus for speech recognition. For example the level drop in the head or end portion of the user spoken word would be detected. In case that the user's utterance is not properly received, the user depresses one of the keys in the key unit 430 within a predetermined period. Upon depression of one key, operations return to step 1314 (step 1619). Otherwise the first user spoken word is registered (step 1620). Next the user makes the second utterance. The second utterance is also handled in the same manner as the first utterances. Upon the completion of registration of two words, a message "thank you" is sounded together with the synthesized voice sound corresponding to the telephone number set in step 1609 (step 1622). When one voice registration cycle is completed, the user depresses the "FUNC" and "CLR" keys to cancel the registration mode (step 1603). In this case, assume that the input level of the first utterance is different from that of the second utterance, and the resultant signals having the different levels are used as speech data to be registered. And the user may confirm that 2 words were accurately stored.

Thus upon completion of registration, the telephone dial number set as described above is displayed on liquid crystal display 452. At the same time, the vocal output indicative of registered telephone dial number which is synthesized by voice synthesizer 350b, is sounded from loudspeaker 492. Therefore, the user can visually and audibly confirm the accuracy of the registered telephone dial number. A call error, i.e., a wrong call, caused by a registration error can be prevented.

2-d-1''. Similarity indication

Furthermore, in the above mentioned speech registration mode, an additional function will be available for users. This function is that some indication may be made when the pattern of speech to be registered is similar to one of the patterns of speech which have been already registered. For example, vocal message of "Similar speech pattern has been registered", may be generated from speech synthesis circuit 350b and outputted via speaker 492. In case that the user wishes to be served by this function, the user depresses the "CLR", "X", "Y", "Z", "FUNC", "#", and "6" keys.

Figure 17:
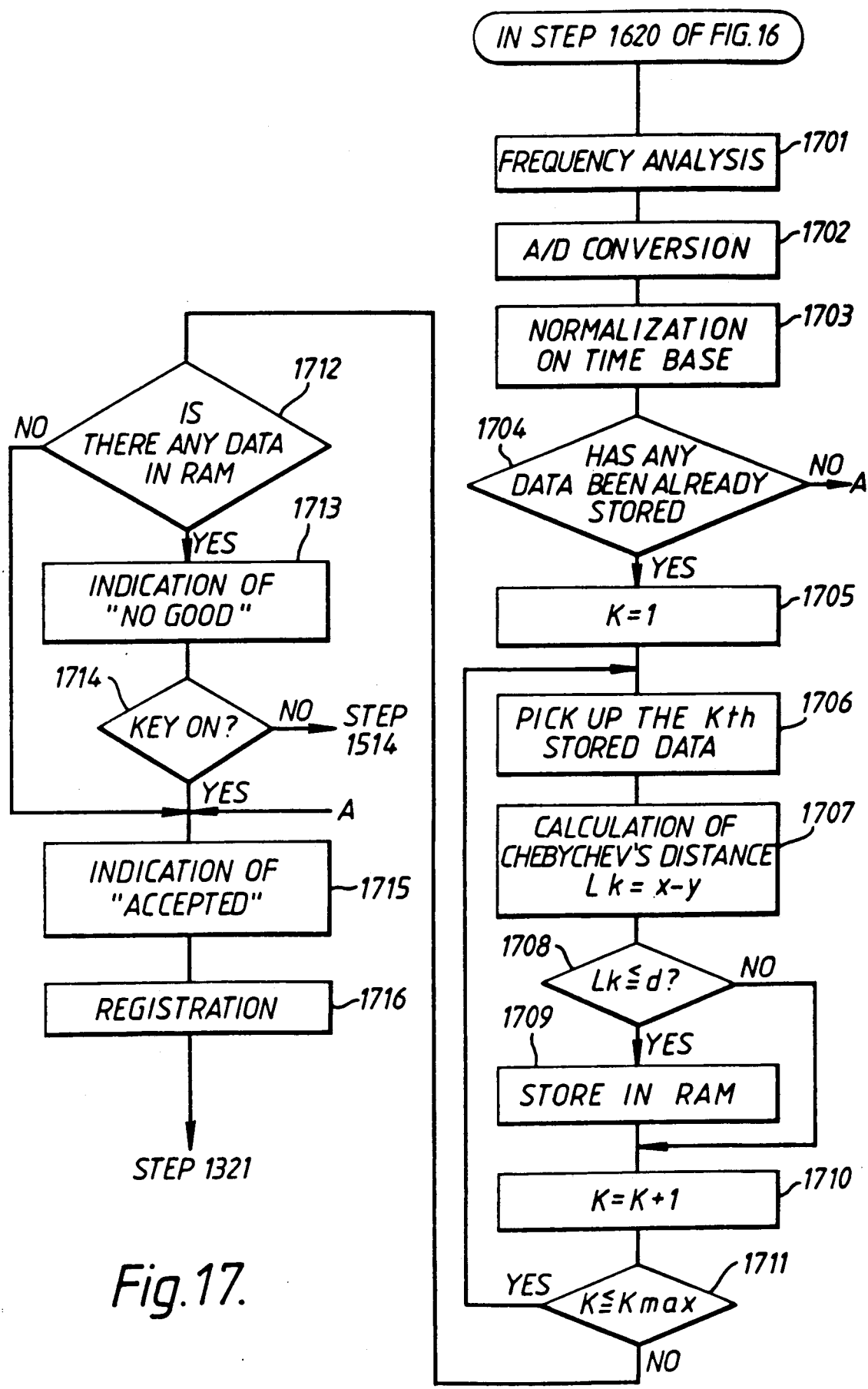
FIG. 17 is a flow chart showing operations of similarity indication function.
Figure 18:
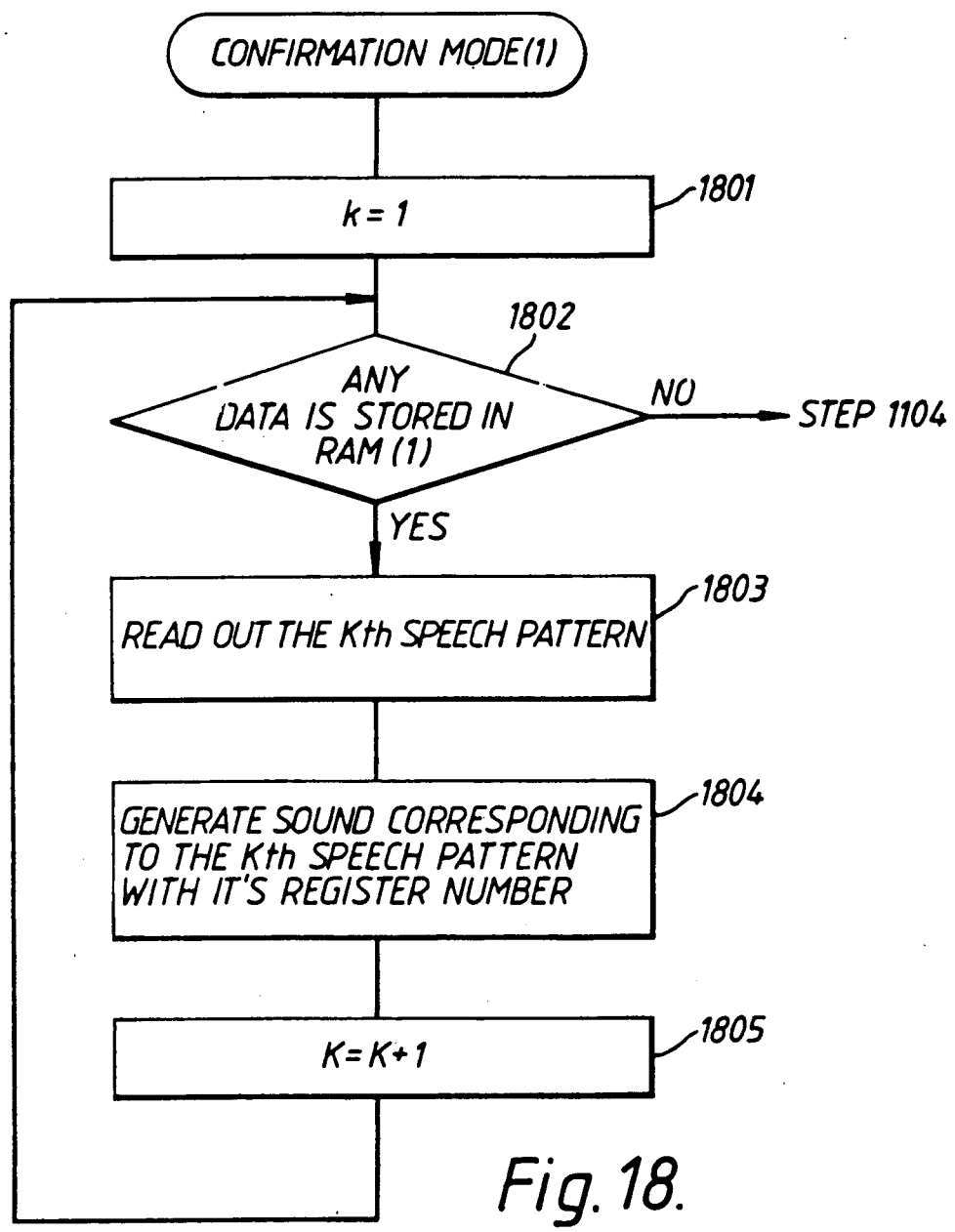
FIG. 18 is a flow chart showing operations in confirmation mode(1)
Figure 19:
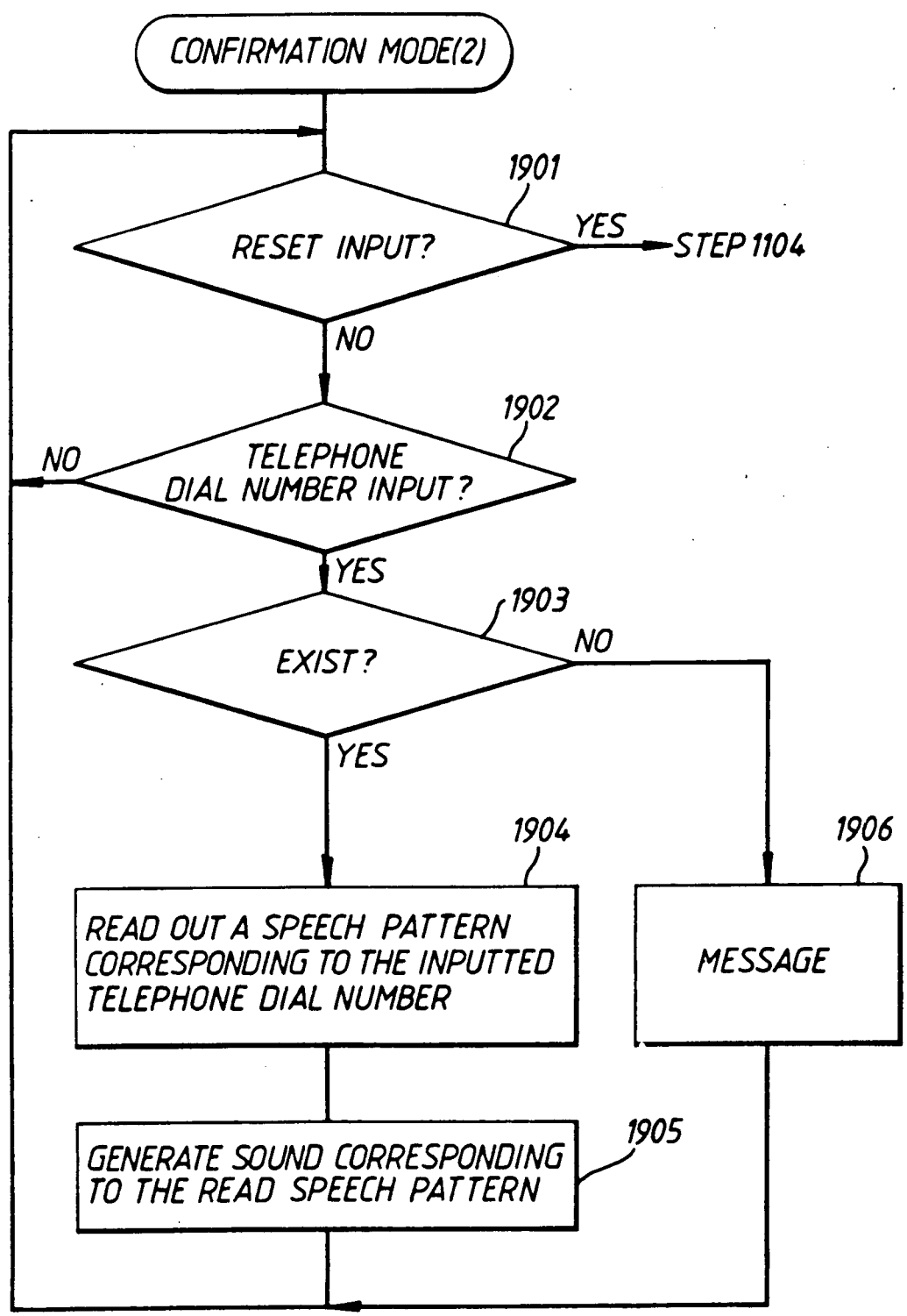
FIG. 19 is a flow chart showing operations in confirmation mode(2)

FIG. 17 is a flow chart showing the operation of such similarity indication function.

In the step 1620 of the above mentioned speech registration mode, the signals indicative of user spoken words to be registered are led to speech recognition circuit 350a of voice dial circuit 350, too. After these signals are amplified by amplifier 357a, 357b in speech recognition circuit 350a, they are filtered by four sets of band-pass filter 357c, 357d, 357e, 357f (step 1701), applied to multiplexer 357g, converted to digital signals from analogue signals at the rate of, e.g., one sample per 10 msec, and outputted as sequential data of, e.g., four bits (step 1702). Then, these sequential data are normalized in the direction of time axis (step 1703) and the time base normalized data are once loaded into RAM 357k as sixteen sets of data, i.e., data sets sampled at sixteen points. Thereafter, in case that registered data have already existed in RAM 358 (step 1704), the following operations are made between data sets (speech data) associated with speech signals stored in RAM 357k and all the data (registered data) which have been already registered in RAM 358 (steps 1705-1716). Firstly, one of registered data is picked up from RAM 358 (step 1706) and loaded into CPU 357i. CPI 357i calculates Chebyshev's distance between speech data loaded into RAM 357k and the one of registered data (step 1707). The Chebyshev's distance means the value of sum of absolute difference between the elements of vector indicative of speech data and the elements of vector indicative of each registered data. Namely the value is calculated by the following equation:

$$Lk = \sum_{i=1,j=1}^{i=4,j=16} Xij - Yij$$

where $Lk$ is Chebyshev's distance (k represents the number of registered data); $Xij$ represents each element of vector indicative of speech data; $Yij$ represents each element of registered data; $i$ represents the number of bit; $j$ represents the number of point.

Then, in case that Chebyshev's distance: $Lk$ equals or is below a predetermined value: C (step 1708), the speech data is determined to be similar to the registered data and the result is temporarily stored in RAM 357k (step 1709).

After the above mentioned processing has been done against all the registered data (step 1711), if the data showing that the speech data similar to the registered data exists is stored in RAM 357k as previously described (step 1712), an indication of no-good is made (step 1713). For example, this indication of no-good may include the display of telephone dial number corresponding to the similar speech data. Still the speech pattern corresponding to this telephone dial number may be reproduced from RAM 708 via speech storage/reproduction LSI 710 and outputted via speaker 492. Accordingly, a user is allowed to determine whether the speech data is to be registered or not upon predetermined manual operations at the key pad 430 or the like (step 1714). If the speech data is to be registered, an indication of OK is made at liquid crystal display 452 (step 1715) and the speech data is registered (step 1716). Thus, since no similar speech patterns are registered, wrong call origination due to the misrecognition of the user spoken words in the afore-mentioned operation of voice dial will be prevented.

Furthermore, while a user is informed in response to the presence of the similar speech pattern, the user is always visually or audibly informed of the telephone dial number or the speech pattern corresponding to the registered speech which is the most similar to the speech pattern to be registered in the same manner as previously mentioned. And whether the speech pattern is to be registered or not may depend on the user's determination.

2-d-2. Confirmation of stored speech (1)

The operation of confirmation mode will be described in reference to FIGS. 3, 7-9, 11, and 18.

In case that the user wishes to confirm the contents of RAM 708 in reception standby state (step 1104 in FIG. 11), he or she depresses "CLR", "X", "Y", "Z", "FUNC", "#", and "7" keys at key pad 430 to set the confirmation mode (step 1113 in FIG. 11). These key inputs are detected by controller 418 and the corresponding command signals are sent to CPU 331 in audio controller 330. Responsive to the command signals, operations of CPU 331 enter into confirmation mode (step 1801). When there is any word stored in RAM 708, CPU 331 accesses speech synthesis circuit 350b and sends a register number. Also CPU 331 accesses speech storage/reproduction LSI 710, loads start and end address information corresponding to the register number from RAM 335 (FIG. 9), and sends them to speech storage/reproduction LSI 710. Firstly, speech synthesis circuit 350b synthesizes speech signals corresponding to the register number. The synthesized speech signals are outputted from speaker 492 via audio circuit 337. Secondary speech storage/reproduction LSI 710 loads speech pattern data of a word stored in an area between the location addressed by the start address and the location addressed by the end address within RAM (1) 708 via RAM I/F 803 (step 1803). Digital data corresponding to the speech pattern of the word are generated from ADM analysis/synthesis circuit 805. The digital signal is converted to an analogue signal at D/A converter 806 and outputted via bandpass filter 807. This analogue signal is transmitted along line: GBM-SP and, via audio circuit 337, outputted from speaker 492 of main unit 400a (step 1804). CPU 331 continues to procede the same operations as above mentioned until all the words stored in RAM (1) 708 are read out. When speech patterns corresponding to all the words stored in RAM (1) 708 have been outputted, operations return to step 1104 in FIG. 11.

2-d-2'. Confirmation of stored speech (2)

The operation of confirmation mode (2) will be described in reference to FIGS. 3, 7-9, 11 and 19.

In case that the user wishes to confirm the speech pattern corresponding to a telephone dial number set in reception standby state (step 1104 in FIG. 11), he or she depresses "CLR", "X", "Y", "Z", "FUNC", "#", and "8" keys at key pad 430 to set the confirmation mode (step 1113 in FIG. 11). These key inputs are detected by controller 418 and the corresponding command signals are sent to CPU 331 in audio controller 330. Responsive to the command signals, operations of CPU 331 enter into confirmation mode. To reset this confirmation mode, the user only depresses "CLR" and "FUNC" (step 1901).

When the user inputs a telephone dial number set, the key inputs are detected by controller 418 and the corresponding signals are sent to CPU 331 (step 1902). CPU 331 searches for the same telephone dial number as the inputted one in RAM 335 (see FIG. 3 and 9) (step 1903). If the same telephone dial number does not exist in RAM 335, CPU 331 activates speech synthesis LSI 364 so that a response message: 'NOT REGISTERED' is generated from speaker 492 or receiver 498 via audio current 337 and also make a display of 'NOT REGISTERED' at display unit 452 by controlling controller 418 (step 1906). Otherwise CPU 331 loads a start address signal and an end address signal corresponding to the telephone dial number from RAM 335 and sends these signals with a signal: 'RD' to speech storage/reproduction LSI 710. Speech storage/reproduction LSI 710 loads speech pattern data of a word storage in an area between the location addressed by the start address and the location addressed by the end address within RAM (1) 708 via RAM I/F 803 (step 1904). Digital data corresponding to the speech pattern of the word are generated from ADM analysis/synthesis circuit 805. The digital signal is converted to an analogue signal at D/A converter 806 and outputted via bandpass filter 807. This analogue signal is transmitted along line: GBM-SP and via audio current 337 outputted from speaker 492 of main unit 400a (step 1905).

While a voice is reproduced responsive to an input of a telephone dial number in the above mentioned embodiment, a voice may be reproduced responsive to an input of a registration address (register number).

2-d-3. Operation for call origination

Figure 20:
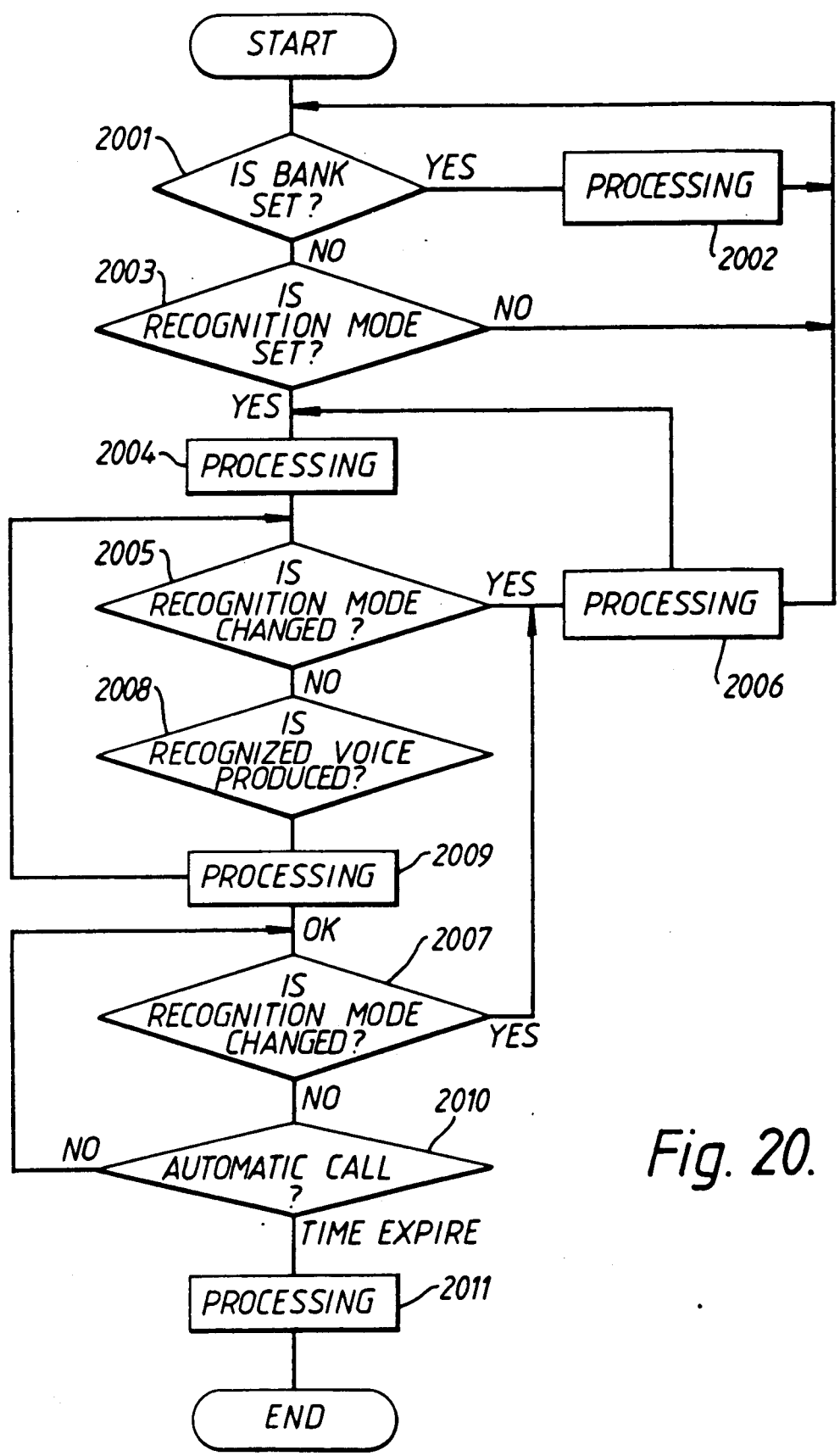
FIG. 20 is a flow chart showing operations of voice dial function.

Voice activated dialing will be described with reference to a flow chart in FIG. 20.

If "banks" are set (step 2001), a desired "bank" is designated (step 2002). This operation can be performed by predetermined key operations. For example, the user sequentially depresses the "RCL", "#", and "X" keys. In this case, "X" is a numerical key, i.e., the "1" or "2" key. The "1" key corresponds to "bank 1", and the "2" key corresponds to "bank 2". The bank number designated as described above is displayed on liquid crystal display 452 and is confirmed by the user.

The voice dial mode (to be referred to as a recognition mode hereinafter) is set (step 2003). This can be set by predetermined key operations at key unit 430. For example, the user depresses any one of the "0" to "9" keys at keys unit 430 for a predetermined period of time or more, e.g., one second or more. When the recognition mode is set as described above, the "beep tone" is different from the normal beep tone. Therefore, the user hears the beep tone produced at loudspeaker 492 and can know that the recognition mode has been set (step 2004). The recognition mode continues within a predetermined period, e.g., 6 seconds. In this case, a recognition mode setting signal (H level signal) with a predetermined key operation is inputted to OR gate 422b through controller 418 shown in FIG. 7.

When the recognition mode is set as described above, a mode transition flag is set at logic "1", which indicates that the mobile telephone apparatus is ready for recognizing a user's voice. In this case, the user may reset the recognition mode or cancel it subject to a predetermined key operation and predetermined conditions (steps 2005 and 2006). For example, the recognition mode is reset when any one of the "0" to "9" keys in the key unit 430 is kept depressed for a predetermined period of time or longer, e.g., one second or longer. More specifically, when one of the "0" to "9" keys is depressed for a predetermined period of time, all voice recognition results are invalidated, and a beep tone is produced at the loudspeaker 492 again. The recognition setting mode can be resumed even during voice recognition (step 2007). If the user utters wrong information or wishes to change the party to be called, the recognition mode can be reset and voice dialing can be resumed. The recognition mode can be canceled upon depression of one of the "0" to "9" keys within one second.

When the user utters a word or more (step 2008), the uttered voice is recognized by the voice recognition circuit 350a, and the corresponding telephone number is accessed. The mobile telephone apparatus determines that the user wishes to make a call, and thus the call flag is set at logic "1" (step 2009). The accessed telephone number is displayed on liquid crystal display 452, and at the same time, the telephone number vocal output synthesized by voice synthesizer 350b is sounded at loudspeaker 492. Therefore, the user can confirm the telephone number so that a so-called wrong call need never be made.

When a predetermined period of time (e.g., three seconds) has elapsed after the telephone number is signalled to the user from liquid crystal display 452 or loudspeaker 492, a call for the accessed telephone number is automatically performed (steps 2010 and 2011). More specifically, mobile telephone apparatus 100 determines in step 1506 (FIG. 15) that the user wishes to make a call and seizes a channel through which a call signal is to be sent. After the user's will for making a call is confirmed, a call signal including at least the telephone dial number information recognized by voice recognition circuit 350a through this channel is sent. When the predetermined period of time has elapsed after conformation of alarm of the recognition result, the telephone number of the user is checked. If the telephone dial number information signalled to the user does not represent the desired telephone number (step 2009), the recognition mode is reset or canceled upon depression of a predetermined numerical key for a predetermined period of time (step 2006). Alternatively, the user depresses the "END" key to cancel the call. In this case, the call interruption signal is generated. A predetermined key operation at key unit 430 is performed prior to an automatic call, thereby setting a call mode. For example, this call mode is set by depression of the "SEND" key prior to the automatic call.

We claim:

1. Telephone apparatus, comprising:
   first means for registering one or more predetermined numbers of data each corresponding to a telephone dial number prior to a user's utterance;
   second means for registering one or more digital speech signals each corresponding to a telephone dial number prior to said user's utterance;
   means for providing one or more telephone dial numbers;
   means, coupled to said providing means, for generating a digital speech signal corresponding to a provided telephone dial number in response to said user's utterance;
   means, coupled to said generating means, for extracting a predetermined number of data corresponding to a generated digital speech signal;
   means, coupled to said extracting means, for storing an extracted predetermined number of data;
   means, coupled to said first registering means and said storing means, for comparing said extracted predetermined number of data to each of one or more registered predetermined numbers of data;
   means, coupled to said generating means and said second registering means, for producing a speech signal associated with a registered digital speech signal for confirming whether said generated digital speech signal is substantially identical to said registered digital speech signal; and
   means, coupled to the comparing means, for automatically originating a telephone call to a telephone dial number, whenever said extracted predetermined number of data is substantially identical to said registered predetermined number of data corresponding to said retrieved telephone dial number.

2. The apparatus of claim 1, further comprising means for indicating to the user whether the user's utterance corresponding to said registered digital speech signal has been received.

3. The apparatus of claim 1, further comprising means, coupled to said second registering means, for generating audible sounds corresponding to said registered digital speech signal.

4. The apparatus of claim 1, further comprising means, coupled to said second registering means, for visually displaying an image corresponding to said registered digital speech signal.

5. The apparatus of claim 2, further comprising means for activating said indicating means.

6. Telephone apparatus, comprising:
   first means for registering one or more predetermined number of data each corresponding to a telephone dial number prior to a user's utterance;
   second means for registering one or more speech signals each corresponding to a telephone dial number prior to said user's utterance;
   means for providing one or more telephone dial numbers;
   means, coupled to said providing means, for generating a speech signal corresponding to a provided telephone dial number in response to said user's utterance;
   means, coupled to the generating means, for extracting a predetermined number of data corresponding to a generated speech signal;
   means, coupled to the extracting means, for storing an extracted predetermined number of data;
   means, coupled to said first registering means and said storing means, for comparing said extracted predetermined number of data to each of one or more registered predetermined numbers of data;
   means, coupled to said second registering means, for reproducing a registered speech signal; and
   means, coupled to the comparing means, for automatically originating a telephone call to a telephone dial number whenever said extracted predetermined number of data is substantially identical to said registered predetermined number of data corresponding to said retrieved telephone dial number.

7. The apparatus of claim 6, wherein said means for providing telephone dial numbers includes means for providing numerical data.

8. The apparatus of claim 6, further comprising means, coupled to said speech signal generating means, for storing the speech signal, wherein said speech signal generating means includes:
   means for converting said user's utterance to an analog signal;

means for converting the analog signal to a digital signal; and means for storing said digital signal in said speech signal storing means.

9. The apparatus of claim 6, further comprising means, coupled to the second registering means, for converting said registered speech signal to an analog value.

10. The apparatus of claim 6, further comprising means, coupled to the generating means, for providing a signal having a set of predetermined frequencies corresponding to said generated speech signal.

11. The apparatus of claim 6, further comprising means, coupled to the generating means, for providing a set of normalized time values corresponding to said generated speech signal.

12. The apparatus of claim 6, further comprising means, coupled to the generating means, for providing a predetermined number of discrete values corresponding to said generated speech signal.

13. The apparatus of claim 6, further comprising means, coupled to said reproducing means, for activating the reproducing means.

14. The apparatus of claim 6, wherein the reproducing means includes means, coupled to the generating means, for reproducing said registered speech signal whenever said corresponding speech signal is generated.

15. The apparatus of claim 6, further comprising:

third means for registering one or more telephone dial numbers prior to said user's utterance; and means, coupled to said third registering means and said means for providing one or more telephone dial numbers, for comparing said provided telephone dial number to each of the one or more registered telephone dial numbers.

16. The apparatus of claim 12, further comprising means, coupled to the generating means, for sampling said generated speech signal to provide said predetermined number of discrete values.

17. The apparatus of claim 13, further comprising means, coupled to the providing means, for displaying said telephone dial number.

18. The apparatus of claim 14, further comprising means, coupled to the providing means, for displaying said telephone dial number.

19. The apparatus of claim 17, wherein said displaying means includes means, coupled to the means for activating the reproducing means, for displaying said telephone dial number corresponding to a reproduced speech signal whenever the reproducing means is activated.

20. The apparatus of claim 18, wherein said displaying means includes means, coupled to the reproducing means, for displaying said telephone dial number corresponding to a reproduced registered speech signal whenever said corresponding speech signal is generated.

21. Telephone apparatus, comprising:

first means for registering on or more predetermined numbers of data each corresponding to a telephone dial number prior to a user's utterance;

second means for registering one or more speech signals each corresponding to a telephone dial number prior to said user's utterance;

means for providing one or more telephone dial numbers;

means for generating a speech signal corresponding to a telephone dial number in response to said user's utterance;

means, coupled to the generating means, for extracting a predetermined number of data corresponding to a generated speech signal;

means, coupled to the extracting means, for storing an extracted predetermined number of data;

means, coupled to the first registering means and the storing means, for comparing said extracted predetermined number of data to each of the one or more registered predetermined numbers of data; and means for automatically originating a telephone call to a telephone dial number, whenever said extracted predetermined number of data is substantially identical to said registered predetermined number of data corresponding to said telephone dial number, wherein said originating means includes means, coupled to the generating means, for storing said generated speech signal, and means, coupled to the second registering means, for reproducing said generated speech signal.

22. The apparatus of claim 21, further comprising means, coupled to the reproducing means, for providing audible sounds corresponding to said registered speech signal.

23. The apparatus of claim 21, further comprising means, coupled to the reproducing means, for activating the reproducing means.

24. The apparatus of claim 21, wherein the reproducing means includes means, coupled to the generating means, for reproducing said registered speech signal when said corresponding speech signal is generated.

25. The apparatus of claim 21, further comprising third means for registering one or more telephone dial numbers prior to the user's utterance, and means, coupled to the third registering means and the means for providing one or more telephone dial numbers, for comparing said provided telephone dial number to each of the one or more registered telephone dial numbers.

* * * * *